United States Patent [19]

Kapoor et al.

[11] Patent Number: 4,715,111
[45] Date of Patent: Dec. 29, 1987

[54] REMOTE REPAIR SYSTEM FOR NUCLEAR FUEL ROD ASSEMBLIES

[75] Inventors: Anoop Kapoor, Murrysville Boro; Edward J. Choby, Irwin, both of Pa.; Thomas J. Kramer, Cincinnati, Ohio; James E. Ranieri, Jeannette; Charles H. Roth, Jr., North Huntingdon; Donald E. Scheffer, Washington Township, Westmoreland County; John E. Spehar, Jr., Sewickley Township, Westmoreland County; Csaba Bessko, Pittsburgh; Robert M. Blumstein, Greensburg, all of Pa.

[73] Assignee: Westinghouse Electric Corp., Pittsburgh, Pa.

[21] Appl. No.: 746,897

[22] Filed: Jun. 20, 1985

[51] Int. Cl.[4] .................. B23P 19/00; B23P 21/00; B23Q 15/00
[52] U.S. Cl. .................. 29/723; 29/400 N; 29/402.08; 29/466; 29/467; 29/703; 29/720; 376/258; 376/262; 376/271; 376/463; 414/146; 414/745
[58] Field of Search .............. 29/402.08, 723, 428, 29/434, 464, 466, 467, 559, 400 N, 703, 720; 414/745, 786, 146; 376/245, 248, 249, 258, 262, 271, 463, 434, 450

[56] References Cited

U.S. PATENT DOCUMENTS

| | | | |
|---|---|---|---|
| 3,733,250 | 5/1973 | Van Santen et al. | 376/271 X |
| 3,904,048 | 9/1975 | Van Santen et al. | 414/146 X |
| 3,938,845 | 2/1976 | Fehl et al. | 376/262 X |
| 4,030,973 | 6/1977 | Hoffmeister et al. | 376/262 |
| 4,272,321 | 6/1981 | Betancourt et al. | 376/262 |
| 4,279,699 | 7/1981 | Kuhn | 414/146 X |
| 4,311,557 | 1/1982 | Kowalski et al. | 414/146 X |
| 4,487,741 | 12/1984 | Vuckovich et al. | 376/245 X |
| 4,522,780 | 6/1985 | Shallenberger et al. | 376/260 |

FOREIGN PATENT DOCUMENTS 2623103  12/1977  Fed. Rep. of Germany ...... 376/271

OTHER PUBLICATIONS

D. S. Madden & M. E. Hickey, "Conceptual Design for a Backup In-Vessel Fuel Handling Machine (IVH-M-BD) for the FFTF, Aerojet Mfg. Co., a paper presented at the twenty-third conference on Remote Systems Technology, San Francisco, Calif. (Nov. 17-20, 1975).

Primary Examiner—Howard N. Goldberg
Assistant Examiner—Ronald S. Wallace

[57] ABSTRACT

A system for remotely repairing nuclear fuel rod assemblies is disclosed herein. Generally, the system comprises a rod handler for gripping, lifting, lowering and ungripping a selected fuel rod, a work station for securing the nuclear fuel rod assembly to be repaired into a desired location, and a positioner device for laterally positioning the rod handler over a selected rod in the fuel assembly secured within the work station. The rod handler includes a contractable collet for gripping and ungripping a desired fuel rod, and a rod sensor concentrically disposed within the collet for sensing when a rod is in a grippable position. The positioner includes a movable carriage which is slidably mounted onto a frame assembly by means of a pair of rail and bearing mechanisms. The system also includes a microcomputer for controlling the manner in which the positioner positions the rod handler, as well as gripping, lifting, lowering and ungripping motions of the handler itself. In order to maximize system safety, the microcomputer is programmed to deactuate the rod handler when it detects the handler is exerting an excessive amount of tensile force onto the rod.

30 Claims, 28 Drawing Figures

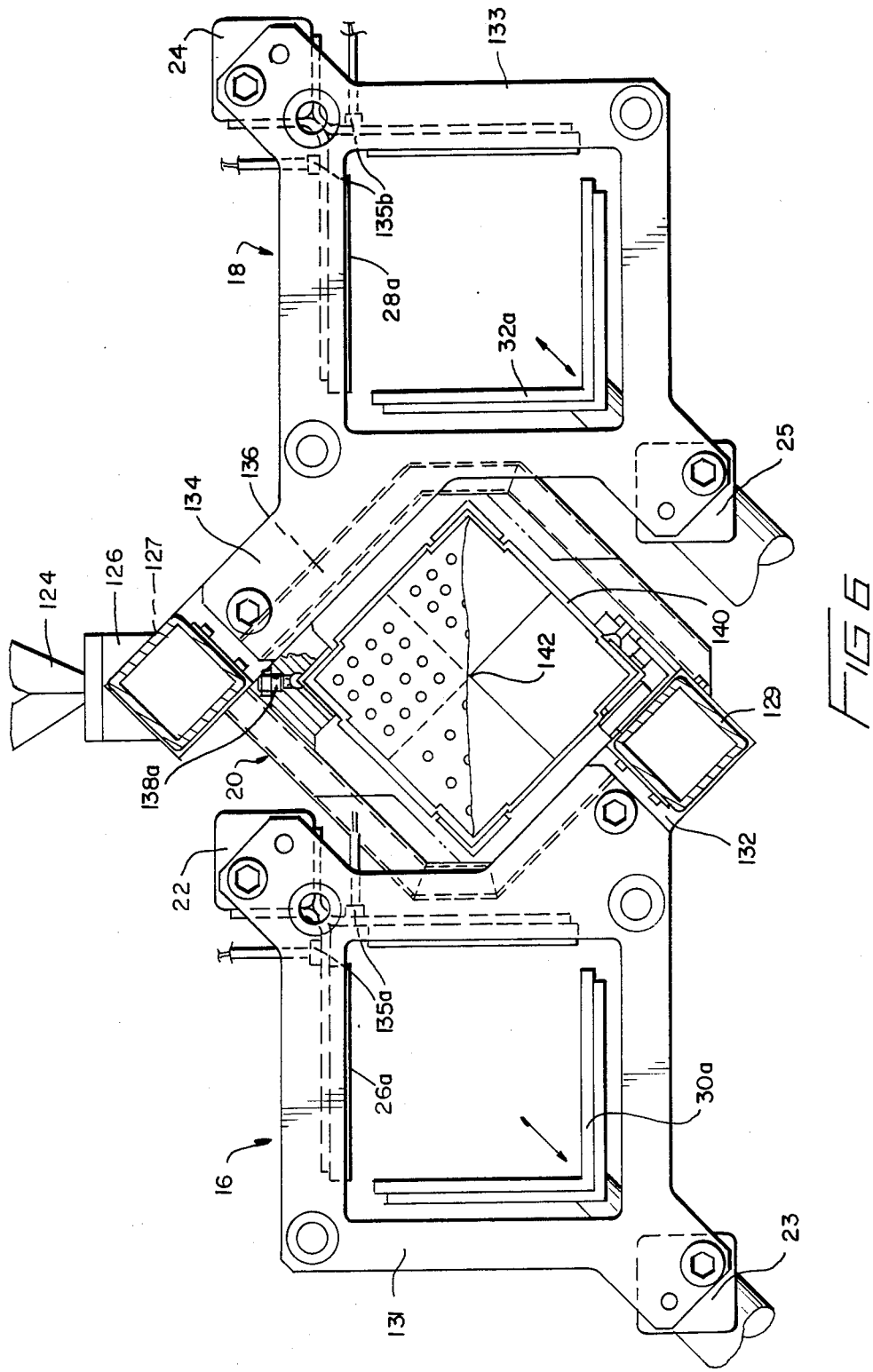

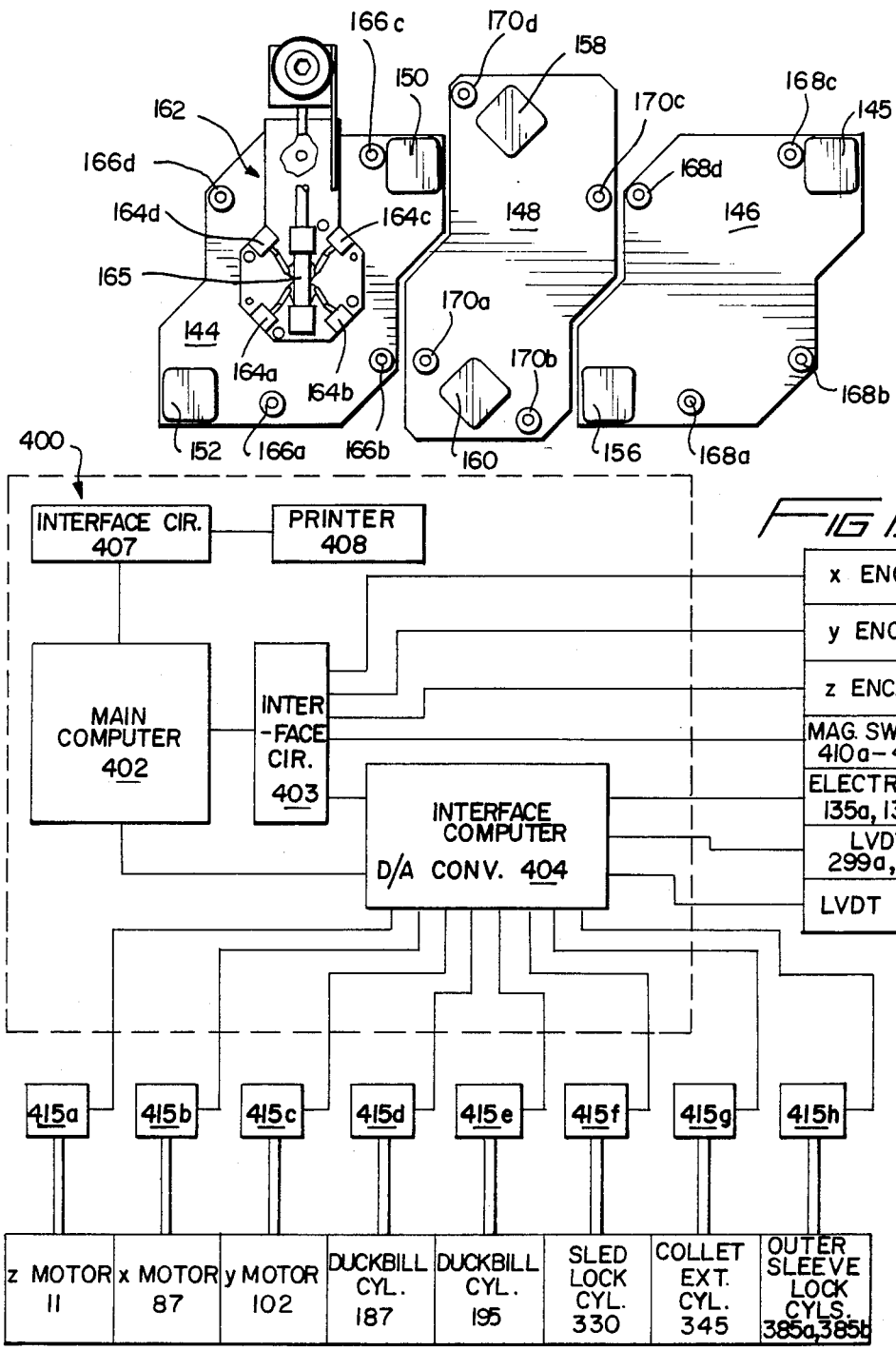

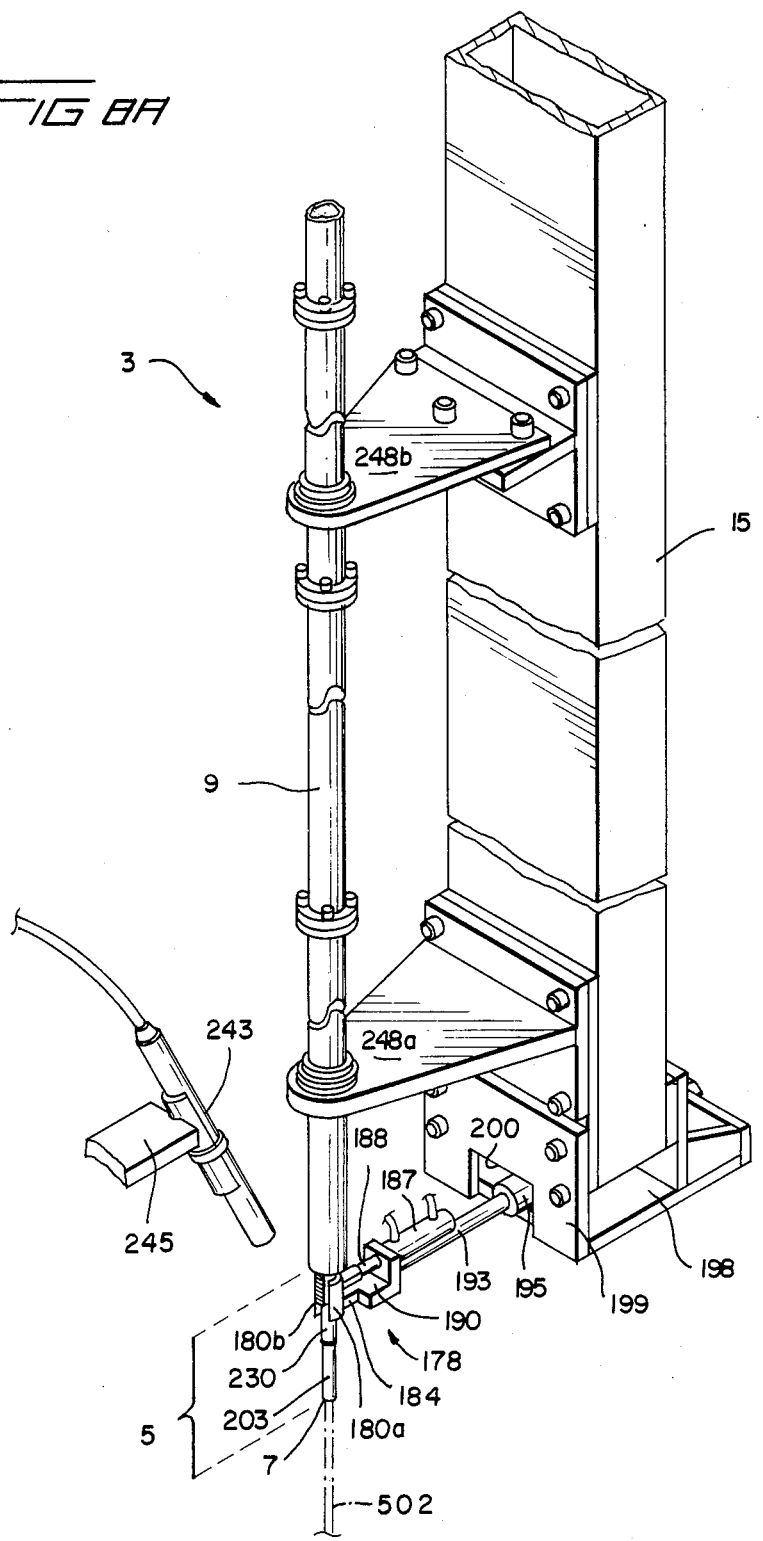

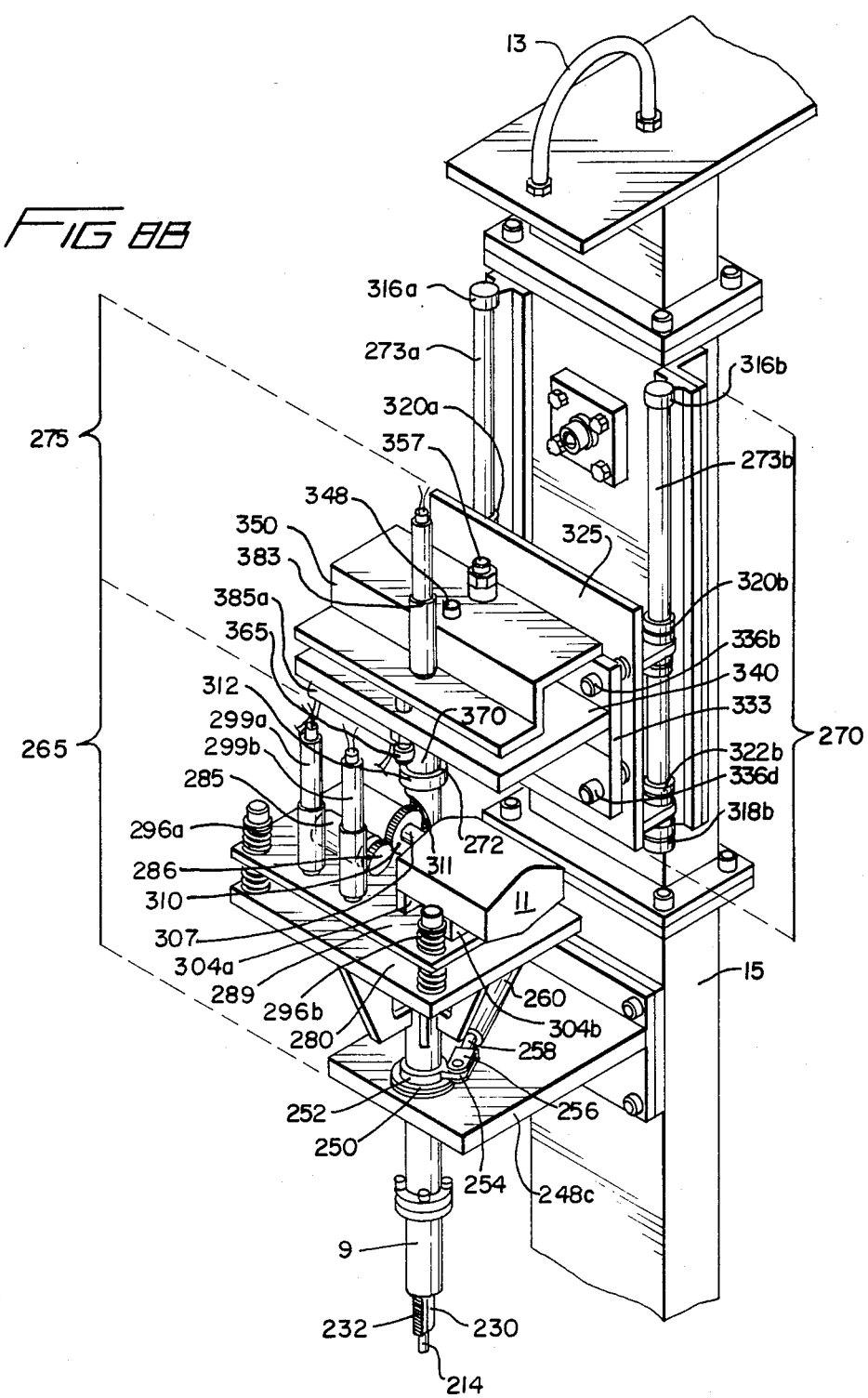

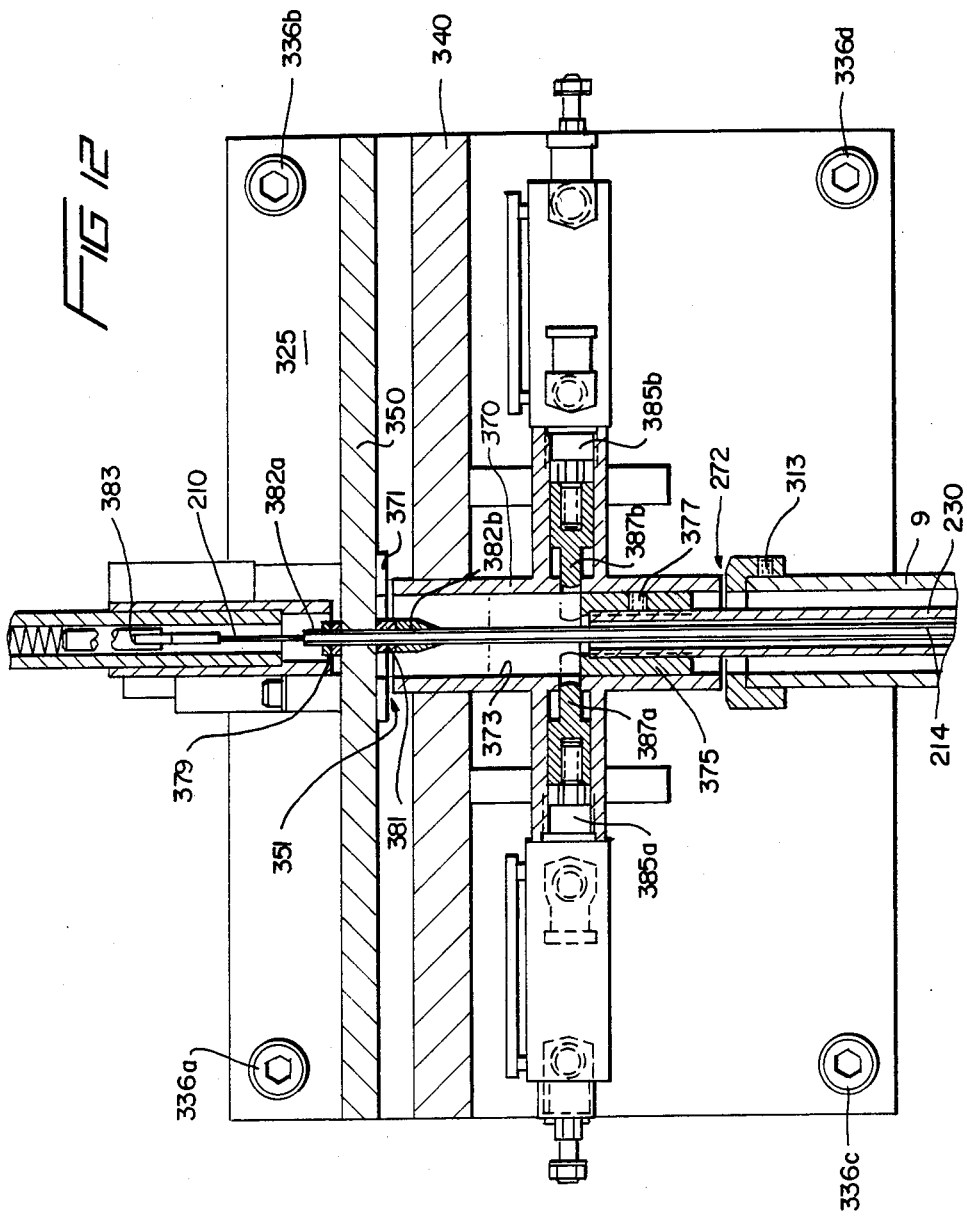

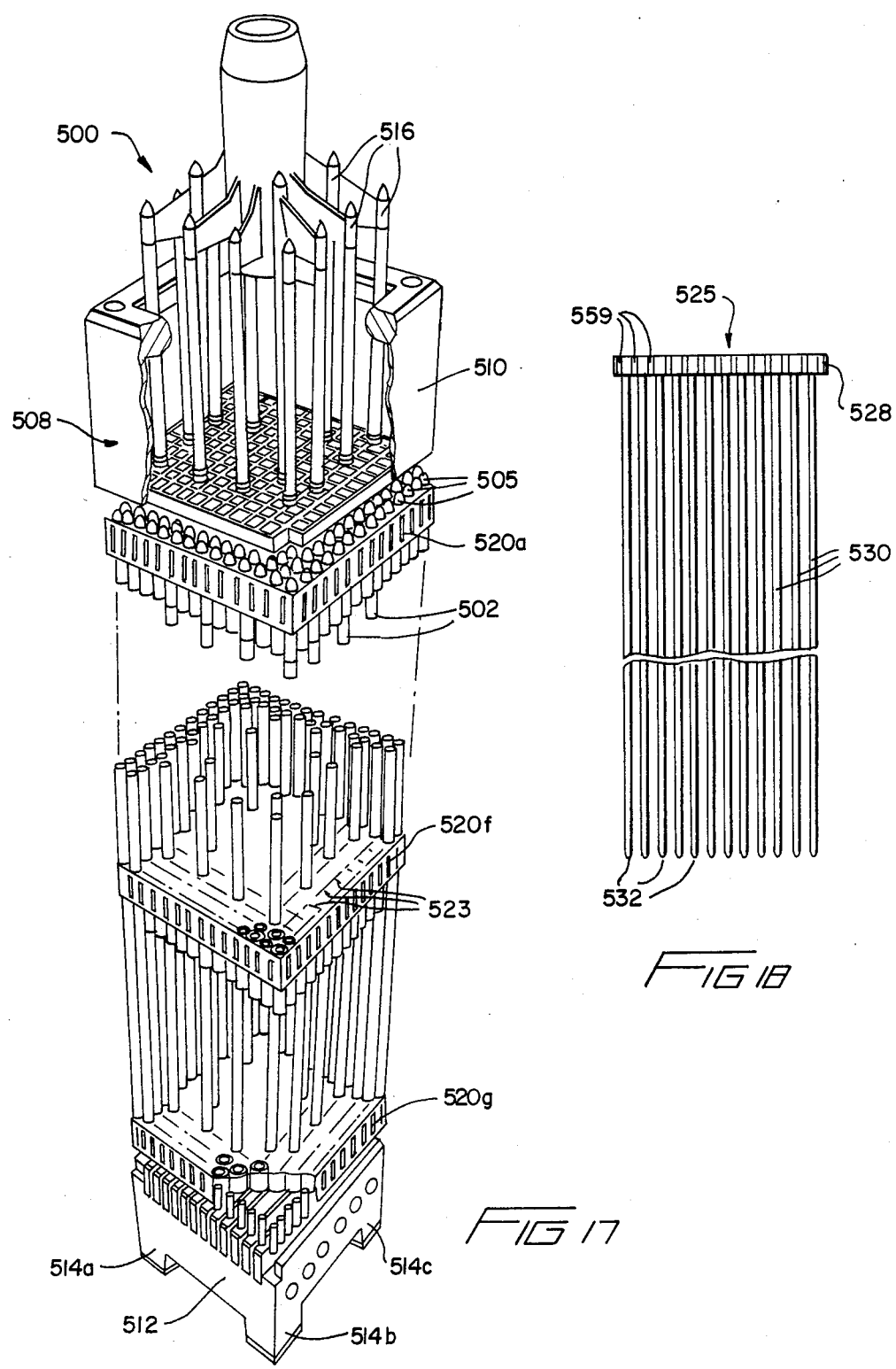

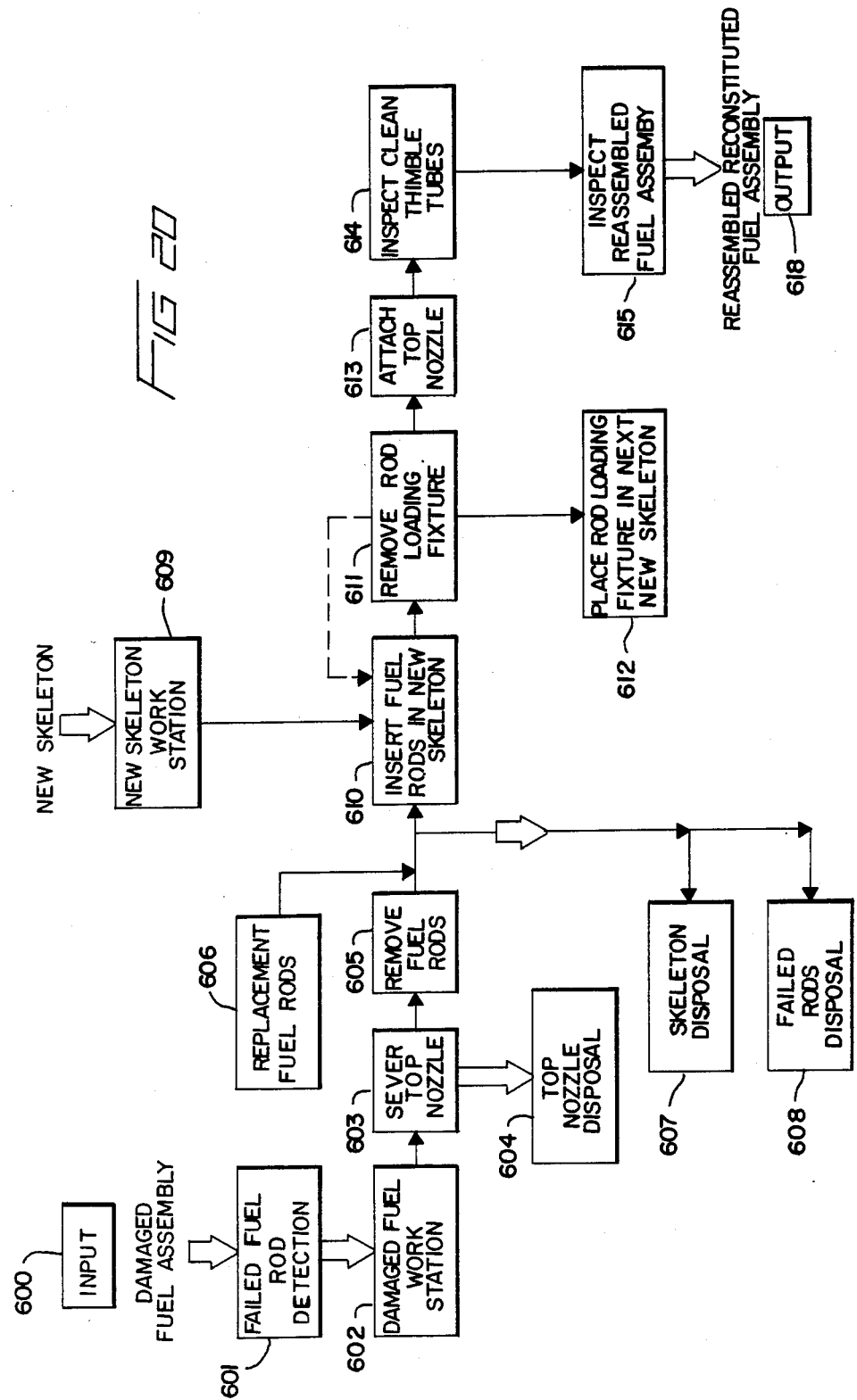

REMOTE REPAIR SYSTEM FOR NUCLEAR FUEL ROD ASSEMBLIES

BACKGROUND OF THE INVENTION

1. Field of the Invention

The invention generally relates to a system for remotely repairing nuclear fuel rod assemblies having damaged fuel rods or damaged skeletons. The system is capable of producing usable fuel rod assemblies by either replacing damaged fuel rods in an assembly having an intact skeleton, or by moving the usable fuel rods from an assembly having a damaged skeleton into an undamaged skeleton.

2. Description of the Prior Art

Tools for repairing damaged fuel rod assemblies are known in the prior art. Such tools may be used to either reconstitute a fuel rod assembly having damaged fuel rods, or to reassemble an assembly having a damaged support skeleton. In reconstitutiontype repairs, only the defective fuel rods from the undamaged support skeleton are pulled and replaced with new fuel rods. In reassembly-type repairs, all of the undamaged fuel rods are removed from the damaged support skeleton and inserted into a new, undamaged skeleton. In order to implement these two types of repair operations, manual tools have been developed for individually gripping, lifting, lowering and ungripping specific fuel rods from one support skeleton to another.

Unfortunately, the use of such prior art manual tools to implement the reconstitution or reassembly repair operations is not without shortcomings. However, before these shortcomings may be fully appreciated, some brief background as to the structure, operation, and environment of such fuel rod assemblies is necessary.

Nuclear fuel rod assemblies generally comprise 200 to 290 fuel rods mounted in a square array within a support skeleton. The support skeleton in turn is formed from bottom and top nozzle assemblies which are connected to one another by 24 uniformly arrayed thimble rods. The bottom and top nozzles are about 8 to 9 inches square, and the thimble rods are about 13 feet long, so that the overall shape of the fuel assembly is that of an elongated, rectangular prism (see FIG. 17). The fuel rods themselves are about 12 feet long. In order to equidistantly space the long and relatively flimsy fuel rods within the support skeleton, the skeleton includes approximately seven grids, each of which has a square array of apertures for receiving and spacing the fuel rods. The grids are usually sheet-metal structures fabricated from a heat-treated, high strength stainless steel in an "egg crate" type of design which lends compressive strength to the grids with a minimum of weight. In operation, an array of nuclear fuel rod assemblies is placed in the reactor core, and a jet of pressurzied water is guided through the bottom nozzles thereof in order to uniformly absorb the heat generated by the rods. In nuclear reactors of the type designed by Westinghouse Electric Corporation, the assignee of the present invention, the velocity of the pressurized water forced through the bottom nozzles of the fuel structures is on the order of 15 ft./sec.

In some nuclear cores, this 15-ft./sec. flow of water has created pressure differentials which in turn have resulted in side-currents which flow laterally through the fuel rod assemblies disposed in the core. These side currents sometimes produce vibrations in the fuel rods which can eventually weaken and break the rods through a fretting action.

In order to repair such damaged fuel rod assemblies, the damaged assembly is typically lowered into the cask-loading area (or shaft) of the spent fuel area of the nuclear plant. The cask-loading shaft is approximately 40 feet long, and filled with water in order to shield workers (who typically stand on a deck located over the shaft) from radiation. In reconstituting or reassembling such damaged fuel rod assemblies, the workers on the deck over the cask-loading shafts use elongated hand tools capable of gripping and withdrawing a single rod out of the fuel assembly after the top nozzle assembly has been cut and removed therefrom. Small television cameras are often mounted on these tools so that the workers may visually position them over a particular fuel rod. While such tools are capable of gripping, lifting, lowering and ungripping either damaged or undamaged fuel rods within a support skeleton, they are also long and flimsy, and hence slow and cumbersome to use. Additionally, if a worker attempts to pull a warped or bent fuel rod through the grids of a support skeleton, he has no positive way of knowing whether or not he is exerting an excessive tensile force upon the fuel rod. If too much tensile force is applied to the rod, it can break and contaminate the water in the cask-loading shaft with pellets of radioactive uranium oxide. Further, while the water in the cask-loading shaft does afford an effective shield for the majority of radiation emanating from the fuel rod assembly being repaired, workers positioned on the deck still receive some small amount of potentially hazardous radiation.

Clearly, there is a need for a system for automatically and remotely reconstituting or reassembling damaged fuel rod assemblies which is fast, efficient and safe. Ideally, such a system should include some sort of means for preventing an excessive amount of tensile force from being applied onto damaged fuel rods in order to minimize the probability that such rods will break and spill their respective radioactive contents. Finally, such a system should be completely remotely operable in order to insulate system operators from any amount of potentially harmful radiation.

SUMMARY OF THE INVENTION

In its broadest sense, the invention is a system for remotely repairing a nuclear fuel rod assembly which may have damaged fuel rods, a damaged support skeleton, or both. The system generally comprises a rod handling means for gripping, lifting, lowering and ungripping a selected fuel rod from the fuel rod assembly, at least one work station for securing the fuel rod assembly, and a positioning means for laterally positioning the rod handling means over a selected rod in the fuel rod assembly. The system is designed to operate within the water-filled, cask-loading shaft of the spent fuel area of a nuclear power plant.

The rod handling means preferably includes a housing for receiving and protecting the fuel rods it vertically moves. This housing protects the rod against the shear or bending forces applied thereupon by the water in the cask-loading shaft when the rod is moved laterally within the shaft. Additionally, the rod handling means may include a gripping assembly having a contractable collet with a rod sensor concentrically dispsoed within for sensing when a fuel rod is in a grippable position within the collet. Finally, the rod handling means may include a locking means for locking the contractable collet of the gripping assembly into a gripping position during the lifting and lowering processes.

The work station of the invention may include an array of hydraulically-actuated clamps for positioning and securing the fuel rod assembly within itself. Additionally, the system may include a second and a third work station for supplying an array of fuel rods which may be used to replace damaged fuel rods within the assembly being repaired. These replacement fuel rods may be arrayed within another fuel rod assembly having a damaged skeleton which is secured within the second work station, or within a fuel rod cask secured within the third work station.

The positioning means of the system generally functions to position the rod handling means in selected positions over the first and second work stations in order to grip, lift, lower and ungrip selected fuel rods in selected positions within these work stations, either to replace damaged fuel rods within a fuel rod assembly having an intact skelton, or to remove undamaged fuel rods from an assembly having a damaged skeleton. The positioning means includes a movable carriage for holding and moving the rod handling means between the first and second work stations, and a frame assembly for supporting the movable carriage. The movable carriage may be slidably connected to the frame assembly by a rail and bearing means. A motor means preferably drives the movable carriage into selected positions across the frame assembly. Additionally, the positioning means may include a baseplate having a leveling means for supporting both the frame assembly and the work stations.

Finally, the system may include a control circuit operatively connected to both the rod handling means and the motor means of the positioner for remotely controlling the position of the movable carriage over the first and second work stations, and the gripping, lifting, lowering and ungripping motions of the rod handling means. The system provides a safe, quick and convenient method for reassembling fuel rod assemblies having damaged rods, or for salvaging undamaged fuel rods from fuel assemblies having damaged skeletons.

BRIEF DESCRIPTION OF THE SEVERAL FIGURES

FIG. 6 is a top plan view for the top frame plates of the work stations of the system;

FIG. 7 is a top plan view of the bottom frame plate of these work stations;

Figure 9:
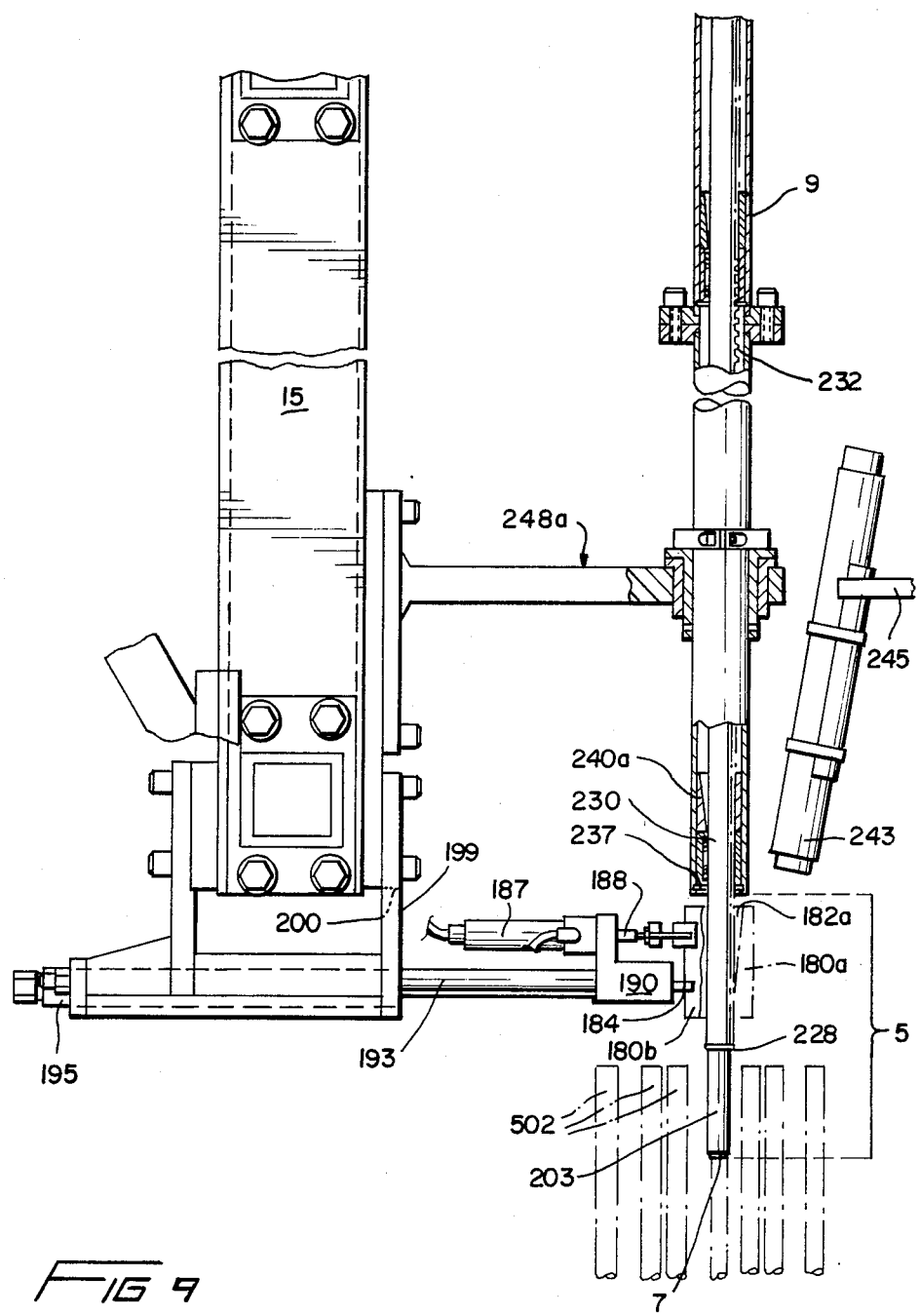
Figure 10:
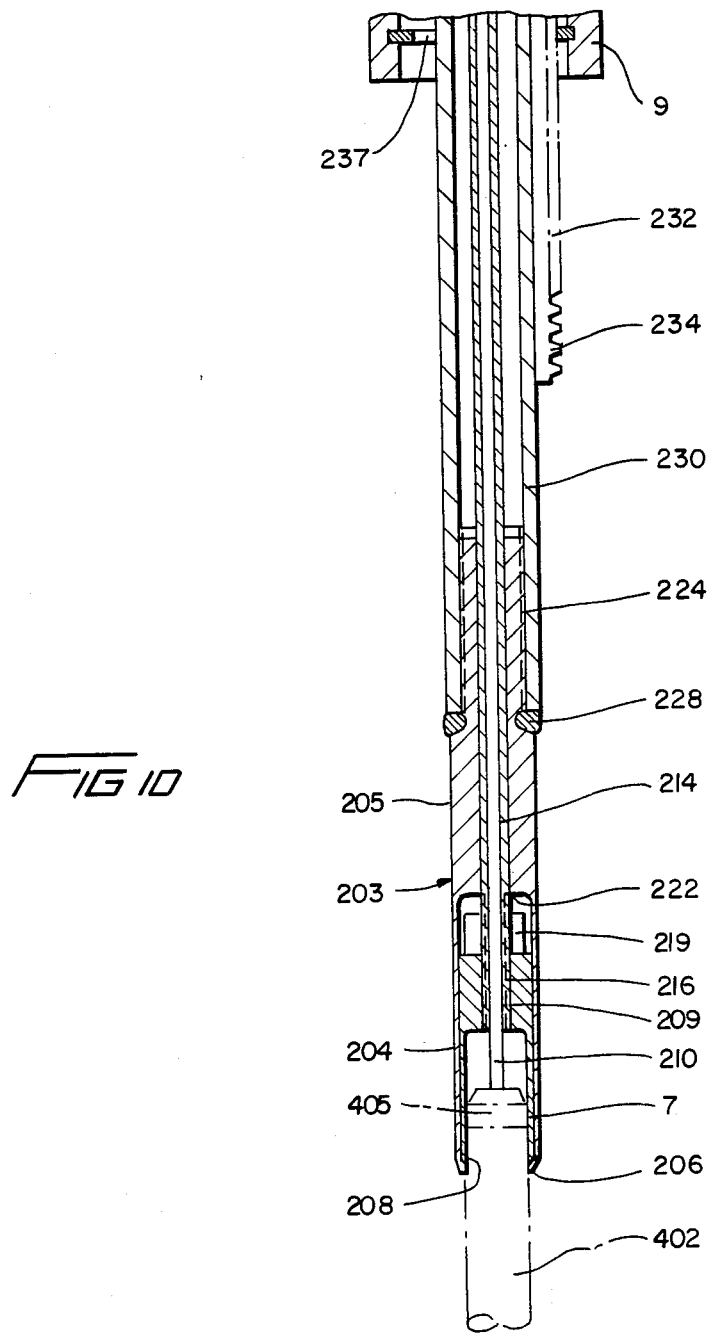
Figure 11:
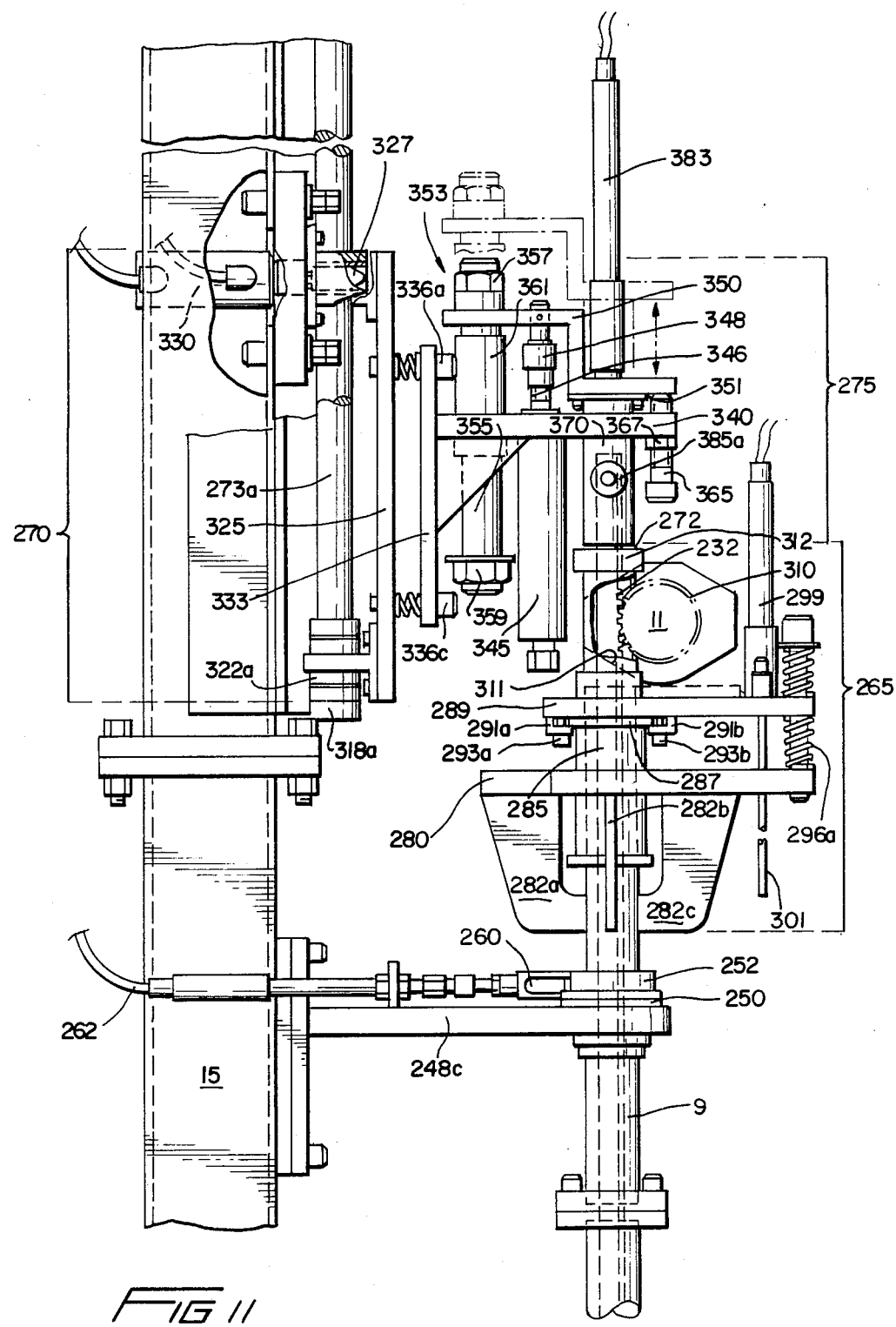
Figure 14A:
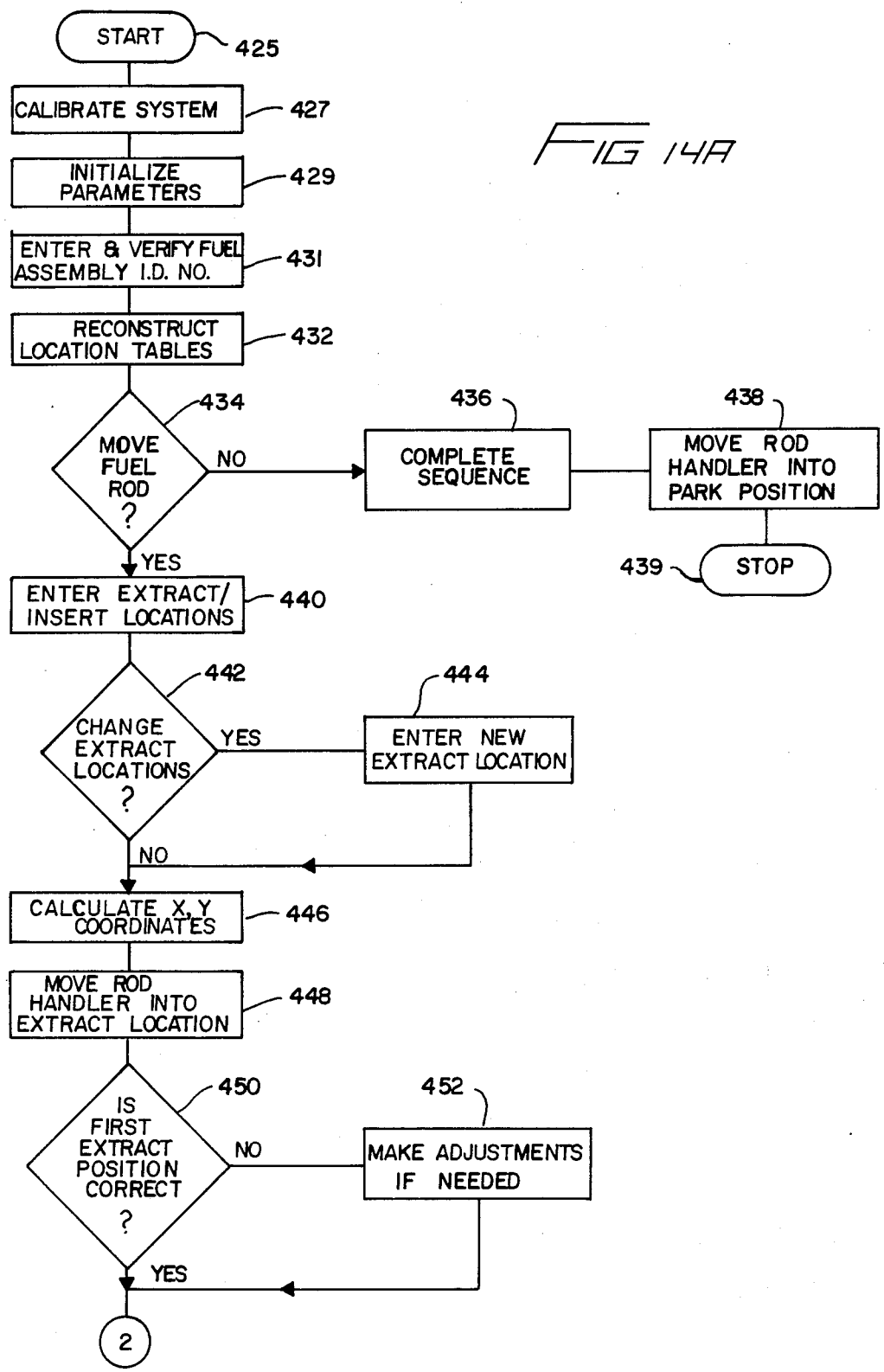
Figure 14B:
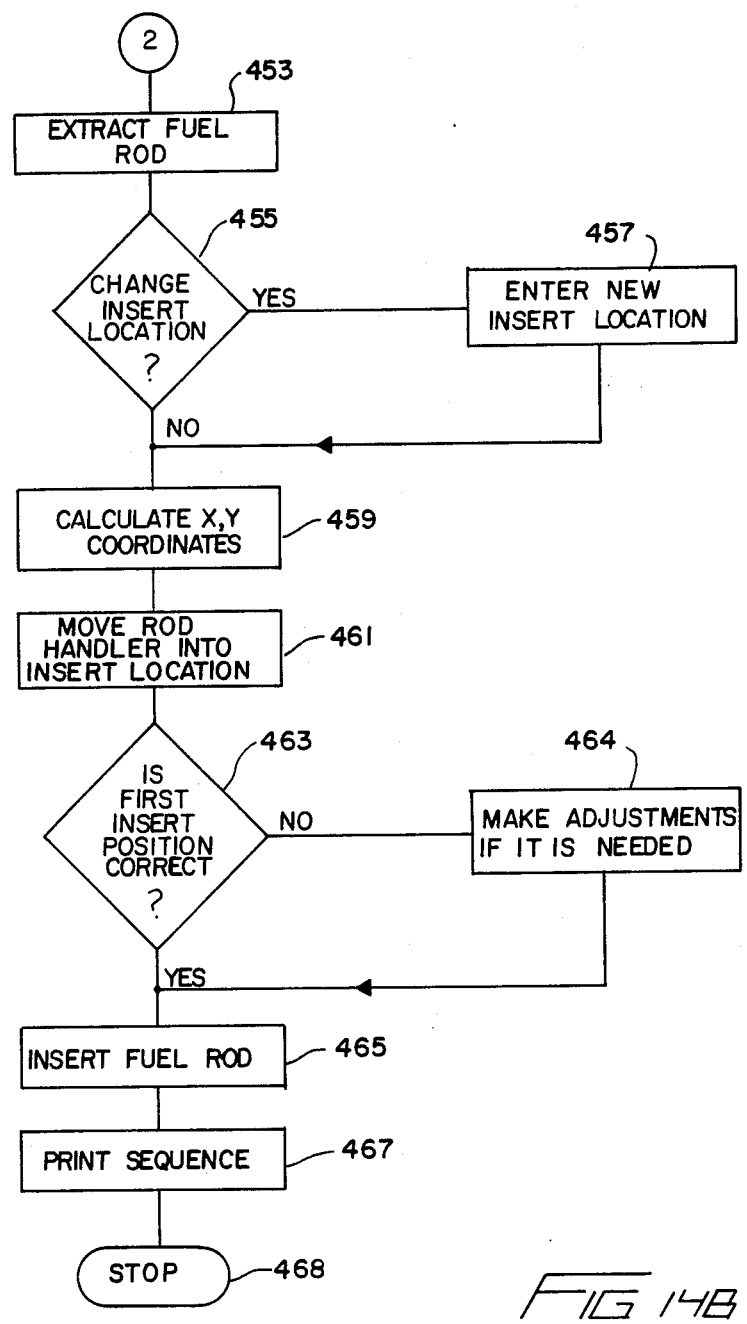
Figure 15:
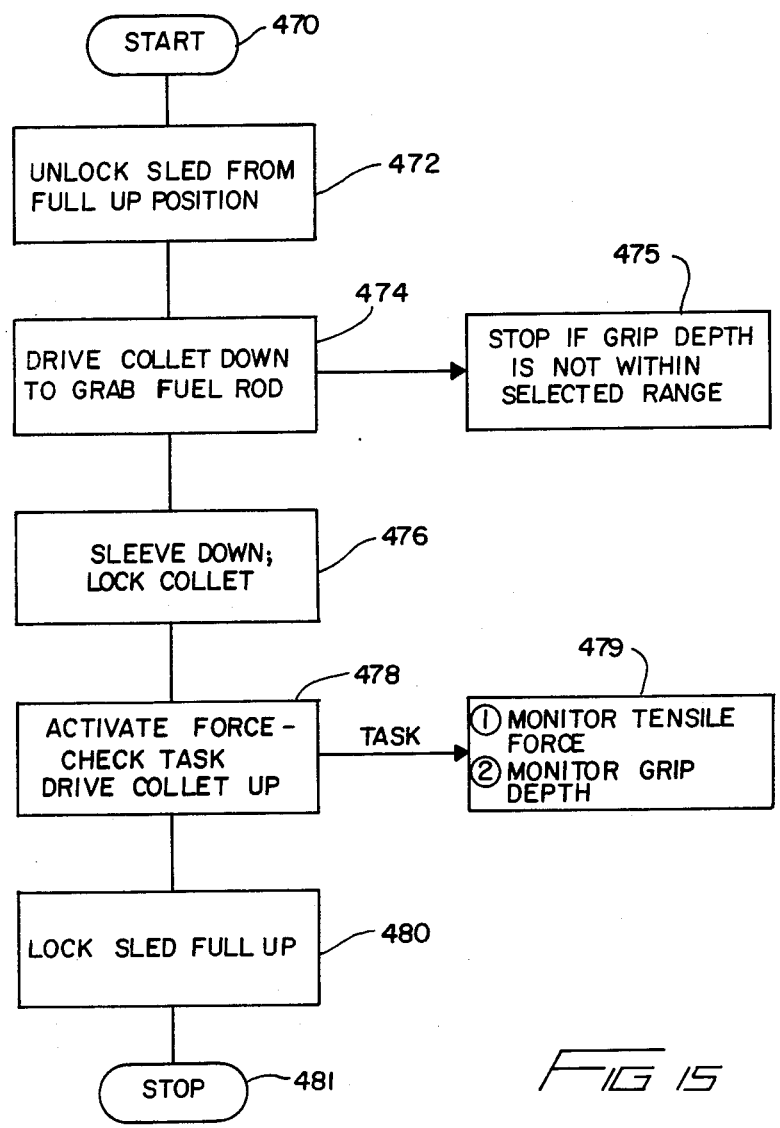
Figure 16:
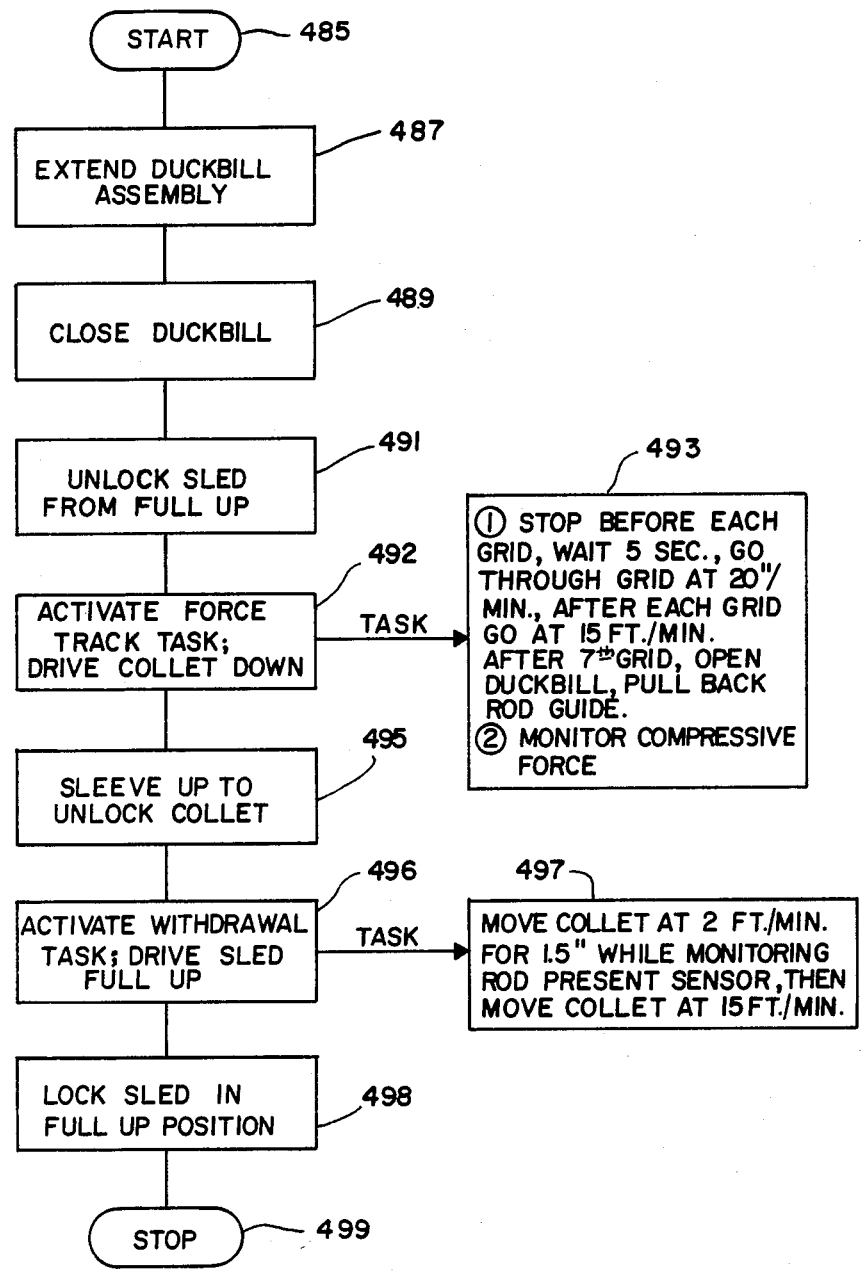
Figure 19A:
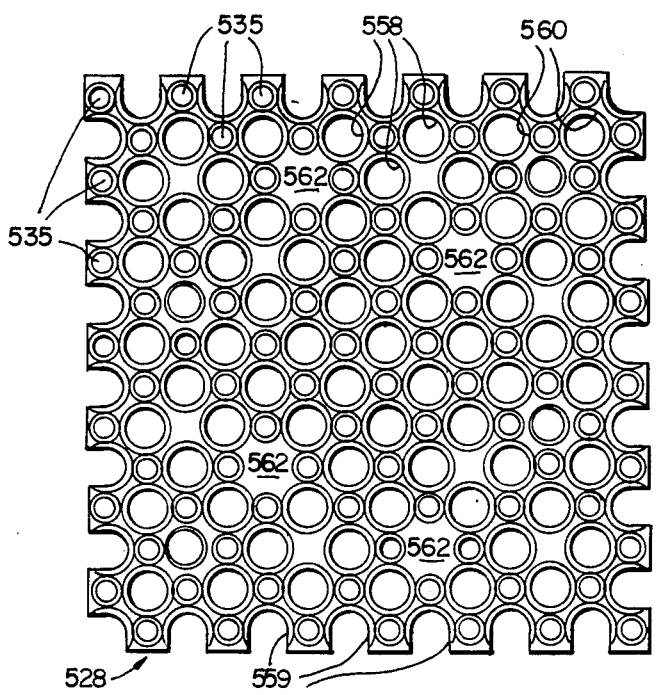
Figure 19B:
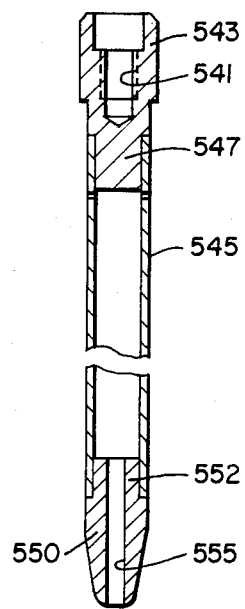
Figure 19D:
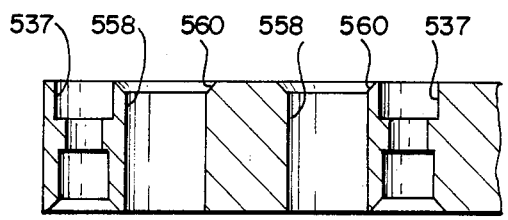
Figure 19E:
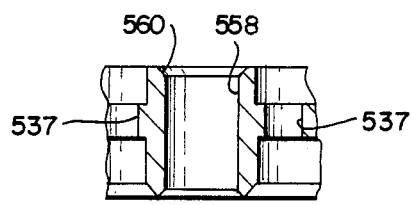
Figure 19C:
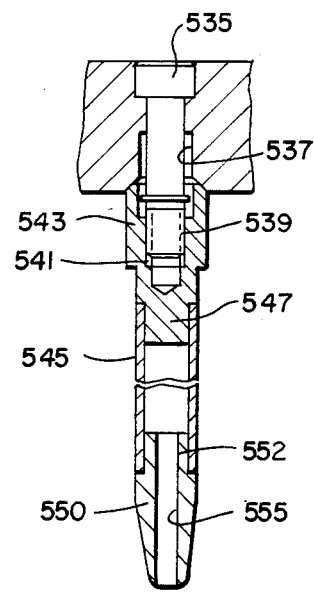

FIGS. 8A and 8B form a perspective view of the rod handler of the system;

FIG. 9 is a partial cross-sectional side view of the lower portion of the rod handler, illustrating the rod gripping assembly and the duckbill mechanism;

FIG. 10 is an enlarged, cross-sectional side view of the gripping assembly of the system;

FIG. 11 is a side view of the upper portion of the rod handler, illustrating the rod lifting and lowering motor, the movable sled, and the collet extension and locking assembly of the rod handler;

FIG. 12 is a cross-sectional front view of the collet extension and locking assembly of the system;

FIG. 13 is a block diagram of the control circuit of the system;

FIGS. 14A and 14B form a flow chart of the general operating routine of the microcomputer of the control circuit;

FIG. 15 a flow chart illustrating the "fuel rod extraction" subroutine used in the general operating routine;

FIG. 16 is a flow chart illustrating the "fuel rod insertion" subroutine used in the general operating routine;

FIG. 17 is a perspective, broken view of a fuel rod assembly;

FIG. 18 is a side view of the fuel rod loading fixture used in connection with the system;

FIG. 19A is a top plan view of the apertured support plate of the rod loading fixture;

FIG. 19B is a cross-sectional side view of one of dummy rods used in the rod loading fixture;

FIGS. 19C, 19D and 19E are cross-sectional side views of selected parts of the apertured support plate, and FIG. 20 is a process chart illustrating the steps of the reassembly process implemented by the system of the invention.

DETAILED DESCRIPTION OF THE PREFERRED EMBODIMENT

General Overview of the Structure and Operation of the Invention

Figure 1:
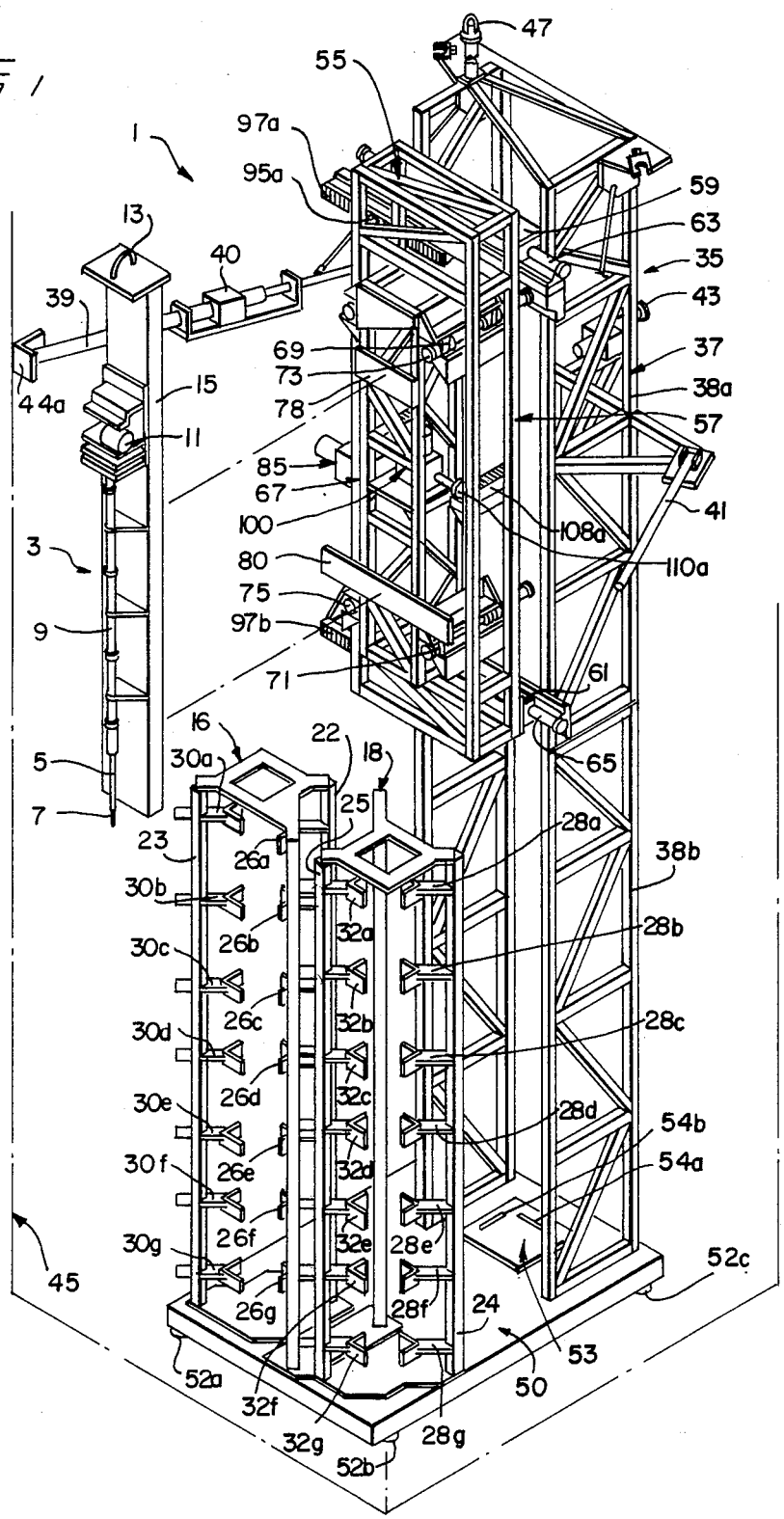
FIG. 1 is an exploded, perspective view of the repair system of the invention, illustrating the frame assembly, work stations, carriage assembly, and rod handler of the invention.

With reference to FIG. 1, wherein like numerals designate like components throughout all of the several Figures, the remote repair system 1 of the invention generally comprises a rod handler 3 for handling single fuel rods, a pair of work stations 16, 18 for positioning and securing fuel rod assemblies, and a positioning assembly 35 for positioning the rod handler 3 at a precise location over one of the work stations 16, 18 in order to lift or lower a particular fuel rod therefrom. While not specifically shown in FIG. 1, the system 1 also includes a third work station 20 disposed between the stations 16 and 18 for positioning a fuel rod cask which may receive damaged fuel rods or supply new ones. Finally, the movement of the rod handler 3 is controlled by a control circuit 400, shown in box form in FIG. 13.

At its lower end, the rod handler 3 includes a gripping assembly 5 having a contractable collet 7 for selectively gripping the end of a fuel rod in a fuel rod assembly secured within either of the work stations 16, 18. Throughout its length, the rod handler 3 includes an elongated, tubular housing 9 for containing a fuel rod which has been gripped and lifted upwardly by the contractable collet 7. Near its upper end, a hydraulic motor 11 is mounted for implementing the rod lifting and lowering operations. Finally, the rod handler 3 terminates in a lifting bale 13 which allows the bridge crane of the spent fuel area (not shown) to easily install the handler 3 onto the positioning assembly 35.

Each of the work stations 16, 18 is a generally rectangular frame formed from a strongback 22, 24 and a support column 23, 25 in opposite corners from one another. In each station, both the strongback 22, 24 and the support column 23, 25 are welded at their bottom ends to the base plate 50 of the positioning assembly 35. Each of the strongbacks 22, 24 includes seven angle members 26a–26g and 28a–28g for receiving the corner of a grid of a nuclear fuel rod assembly. Each of the support columns 23, 25 includes a hydraulically-actuated clamp angle 30a–30g and 32a–32g for selectively positioning and securing the grids of a nuclear fuel rod assembly into the angle members 26a–26g and 28a–28g, respectively. As is indicated in FIG. 1, the angle members 26a–26g and 28a–28g of the work stations 16, 18 are directly opposite from, and aligned with, the hydraulically-actuated clamp angles 30a–30g and 32a–32g.

The positioning assembly 35 of the system 1 generally includes a frame assembly 37 formed from two frame halves 38a, 38b stacked in tandem, a base plate 50 upon which both the frame assembly 37 and the work stations 16, 18 sit, and a carriage assembly 55 for controlling the lateral, forward and reverse (or X-Y) movements of the rod handler 3. The carriage assembly 55 includes an outer frame 57 having upper and lower bearing assemblies 59, 61 which ride upon an upper and lower rail assembly 63, 65 for affording lateral (or X) movements of the carriage assembly 55. The carriage assembly 55 also has an inner frame 67 disposed within the outer frame 58 which likewise includes upper and lower bearing assemblies 69, 71. These bearing assemblies 69, 71 are engaged upon upper and lower rail assemblies 73, 74 and afford forward and reverse (or Y) movements to the carriage assembly 55. Upper and lower mounting plates 78, 80 are attached to the front of the inner frame 67 for receiving the rod handler 3. Finally, both the outer frame 57 and the inner frame 67 incldue rack-and-pinion drive assemblies 85, 100 for implementing the movements of the outer and inner frames 57, 67 in the X and Y directions, respectively.

In an exemplary repair operation, a fuel rod assembly having an intact support skeleton, but a plurality of damaged fuel rods, is lowered into and secured within the work station 16. Next, another fuel rod assembly having a damaged support skeleton, but a plurality of intact fuel rods, is lowered into and secured within the work station 18. In the preferred embodiment, each of the work stations 16, 18 includes an electromicrometer 135a, 135b on its top frame plate to provide a reference point upon which the control circuit 400 may rely when operating the rack-and-pinion drive assemblies 85, 100 which move the rod handler 3.

The top nozzles of the two fuel rod assemblies are removed prior to their positioning within the work stations 16, 18, in order to provide access to their respective fuel rods. The grid coordinates of the damaged fuel rods in the work station 16, and of the undamaged fuel rods in work station 18, are both entered into the memory of the microcomputer 402 of the control system 400. The control system 400 then manipulates the rod handler 3 so that the contractable collet 7 grips and lifts a defective fuel rod out of the fuel rod assembly within the work station 16, and lowers and ungrips this rod into a fuel rod bin held within the third work station 20 (see FIG. 8) located between the two work stations 16, 18. After each damaged fuel rod is so removed, the control system 400 then proceeds to manipulate the rod handler 3 so that its contractable collet 7 grips and lifts an undamaged fuel rod from the assembly within the work station 18, and lowers and ungrips this rod into the recently created rod-receiving space within the fuel rod assembly secured within the work station 16. After all of the damaged fuel rods in the assembly secured within the work station 16 have been replaced with intact fuel rods in the aforementioned manner, a new top nozzle assembly is secured over the reconstituted fuel rod assembly. The strength of the joint between the reconstituted fuel assembly and the new top nozzle assembly is tested by applying a tensile force onto the new nozzle. If the joint holds, the reconstituted fuel assembly is eventually put into service. As will be described in more detail hereinafter, various safety interlocks are provided in both the rod handler 3 and the control system 400, to prevent the system 1 from bending or breaking a fuel rod during either a removal or insertion operation.

Specific Description of the Structure and Operation of the Invention

With reference again to FIG. 1, the positioning assembly 35 of the system includes a frame assembly 37 formed from two essentially identical rectangular frame halves 38a, 38b stacked and secured upon one another in the position shown. The upper frame half 38a includes two securing clamps 39, 41 on each of its sides, respectively, and a third clamp 43 for securing the frame assembly 37 within a water-filled cask-loading shaft 45 located within the spent fuel area of a nuclear plant. Each of the two arm-like securing clamps 39, 41 are pivotally mounted onto cantilevered structures extending from either side of the upper frame half 38a. Additionally, each of the securing clamps 39, 41 includes a screw-jack assembly 40, 42 (of which only assembly 40 is visible, due to the "breaking" of securing clamp 41 in FIG. 1) in order to extend or withdraw the angular clamp pads 44a, 44b (of which only pad 44a is visible) located at the distal ends of clamps 39, 41. The third securing clamp 43 is located on the back of the upper frame half 38a and is likewise extendable or retractable by means of a screw-jack arrangement. In operation, the angular clamp pads 44a, 44b located on the distal ends of each of the securing clamps 39, 41 are firmly abutted against the corners of the stainless steel walls of the cask loading shaft 45, while the rear securing clamp 43 is extended into firm engagement with the rear wall of the shaft 45. The provision of the three extendable securing clamps 39, 41 and 43 allows the frame assembly 37 to be precisely secured within the shaft 45 in a level position. This is important, since accurate operation of the carriage assembly 55 depends upon the accurate equilibration of all drag-inducing gravitational forces acting upon the bearing and rail assemblies in both the outer frame 57 and the inner frame 67.

The upper portion of the frame assembly 37 includes a loading bail 47 which allows a bridge crane (not shown) to easily lift and lower the system 1 within the cask-loading shaft 45. The lower end of the frame assembly 37 is secured onto a base plate 50 having four screw-adjustable feet 52a–52d. The base plate 50 also has a visual leveling indicator 53 which includes two orthogonally disposed bubble levels 54a, 54b for indicating whether or not the base plate 50 is level with respect to the X and Y positions. These bubble levels (as well as all the other bubble levels in the system 1) are accurate to within 2 to 5 minutes per division, or 0.6 to 1.5 mils per foot. In the initial setup of the system 1, the system operator will normally adjust the feet 52a–52d of the base plate 50 until the bubble levels 54a, 54b indicate that the base plate 50 is accurately level. As previously indicated, such accurate leveling of the system 1 as a whole maximizes the accurate operation of the system by equilibrating all of the gravitational drag forces between the various rails and bearings within the carriage assembly 55.

Figure 2:
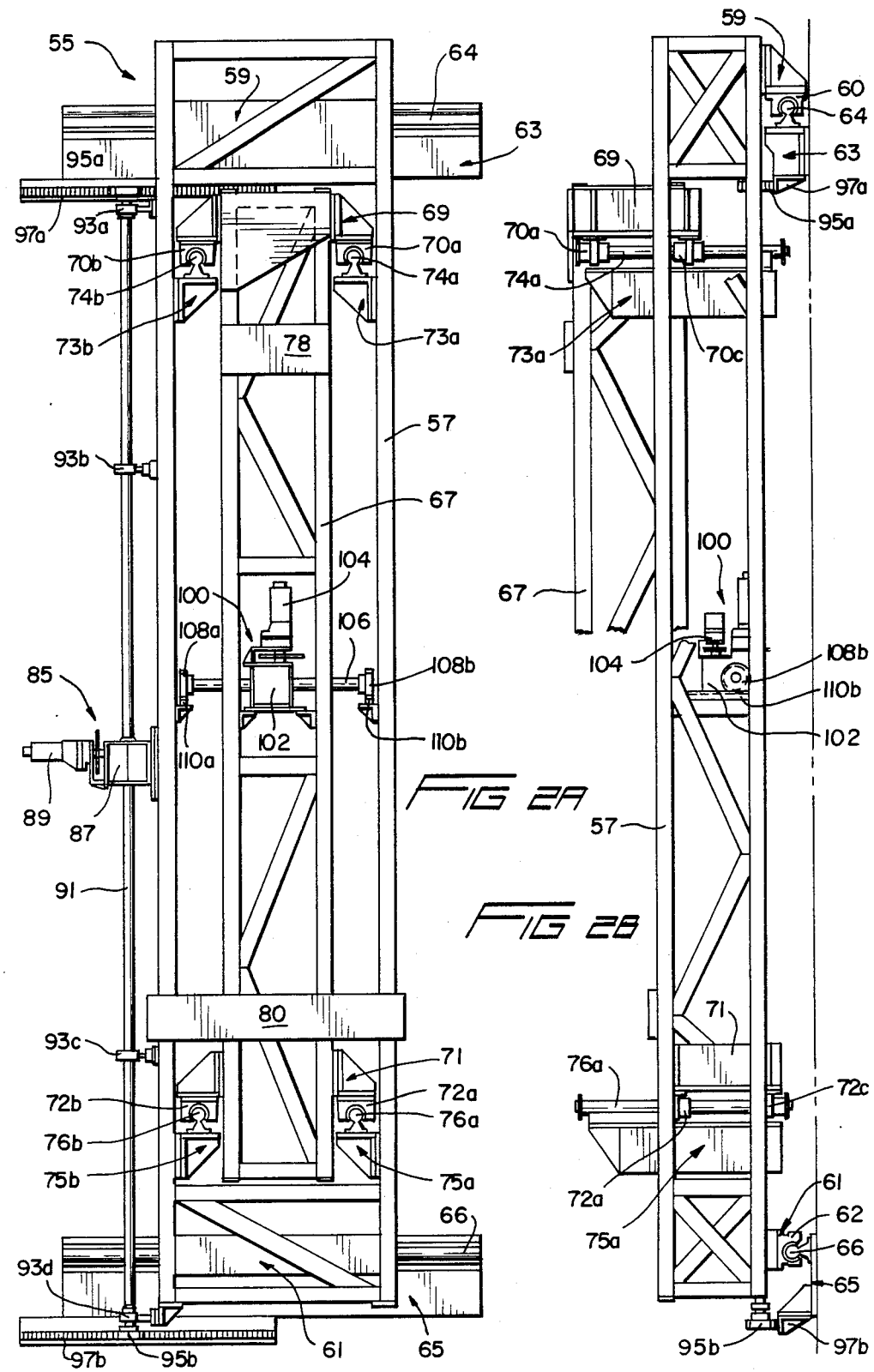
FIGS. 2A and 2B are a front and a side view of the carriage assembly of the repair system.

With reference now to FIGS. 2A and 2B, the carriage assembly 55 of the system 1 includes an outer frame 57 which is slidably mounted onto the upper frame half 38a by means of an upper and lower set of horizontally disposed bearing and rail assemblies. The upper and lower back side of the outer frame 57 includes upper and lower bearing assemblies 59, 61 having linear bearing blocks 60, 62, respectively. The front side of the upper frame half 38a in turn includes upper and lower rail assemblies 63 and 65 with upper and lower rails 64 and 66, respectively. These rails are slidably engageable with the linear bearing blocks 60, 62, as indicated. In order to minimize slack or "play" between the bearing blocks 60, 62 and their respective rails 65, 66, both the rail-receiving portions of the bearing blocks 60, 62 and their respective rails 64, 66 have a complementary circular cross-section, as shown. The outer frame bearing and rail assemblies 59, 60 and 63, 65 allow the outer frame 57 to slide laterally across the face of the frame assembly 37 in the X direction.

The inner frame 67 of the carriage assembly 55 includes an upper bearing assembly 69 having two pairs of linear bearing blocks 70a, 70c and 70b, 70d disposed parallel to one another. The inner frame 67 also includes a lower bearing assembly 71 having linear bearing blocks 72, 72c and 72b, 72d disposed in a like configuration. These bearing blocks are slidably engaged onto a pair of upper and lower rail assemblies 73 and 75, respectively, which are mounted within the outer frame 57 in a parallel relationship. Specifically, bearing blocks 70a, 70c are slidably engaged onto the upper right-hand rail 74a, while bearing blocks 70b, 70c are slidably engaged onto the upper left-hand rail 74b. Analogously, bearing blocks 72a, 72c are slidably engaged onto lower right-hand rail 76a, while bearing blocks 72b, 72d are slidably engaged onto lower left-hand rail 76b. As was the case with the bearing block and rail assemblies of the outer frame 57, each of the upper and lower rails 74a, 74b and 76a, 76b has a generally circular cross-section which is complementary in shape to a generally circular recess present in each of the bearing blocks 70a–70d and 72a–72d. Additionally, the upper and lower rails 74a, 74b and 76a, 76b are all horizontal and mutually parallel to one another. Because the upper and lower rails 74a, 74b and 76a, 76b of the inner frame 67 are orthogonally disposed to the two rails 64, 66 of the outer frame 57, these rails allow the inner frame 67 to slidably move in a forward or reverse (or Y) direction relative to the frame assembly 37. The inner frame 67 also includes upper and lower mounting plates 78, 80 for receiving and securing the rod handler 3 onto the inner frame 67 of the carriage assembly 55.

The outer frame 57 includes a rack-and-pinion drive assembly 85 for moving the outer frame 57 in the X direction with respect to the frame assembly 37. This X motion drive assembly 85 includes a hydraulic motor 87 whose output shaft is mechanically connected to both an electric encoder 89 and a drive shaft 91. The drive shaft 91 is mounted in alignment with the longitudianl axis if the outer frame 57 by four mounting clamps 93a–93d. Mounted on either end of the drive shaft 91 are pinions 95a, 95b. The teeth of these pinions 95a, 95b mesh with the teeth of a pair of racks 97a, 97b which are secured onto the upper and lower rail assemblies 63, 65 connected to the frame assembly 37, respectively. In the preferred embodiment, hydraulic rather than electric motors are used due to the fact that the system 1 normally operates in an underwater environment within the cask-loading shaft 45 of a spent fuel area. In the preferred embodiment, encoder 89 (as well as the other electric encoders 104, 285 used in the system 1) is a motor-type Model BL 102A181-10 encoder having a diametral pitch of 32, which is manufactured by TRW, Inc., of Dayton, Ohio. This encoder is electrically connected to the control circuit 400 which regulates the flow of power to the hydraulic motor 87. Similarly, the inner frame 67 includes a Y motion rack-and-pinion drive assembly 100. Like the X motion drive assembly 85, this assembly 100 includes a hydraulic motor 102 whose output is mechanically connected to both an electric encoder 104 and a drive shaft 106. A pinion 108a, 108b is located at either end of the drive shaft 106. The teeth of these pinions 108a, 108b are meshed with the teeth of a pair of parallel racks 110a, 110b mounted on the sides of the outer frame 57. Both the pinions 108a, 108b and the racks 110a, 110b (as well as the other pinions and racks of the carriage assembly 55) have a diametral pitch of 10.

As was the case with optical encoder 89, encoder 104 is electrically connected to the control circuit 400 which in turn regulates the inflow of power to hydraulic motor 102. A more specific description of how the control circuit 400 controls the hydraulic motors 87, 102 to regulate the X and Y motion of the inner frame 67 will be given hereinafter.

Figure 3:
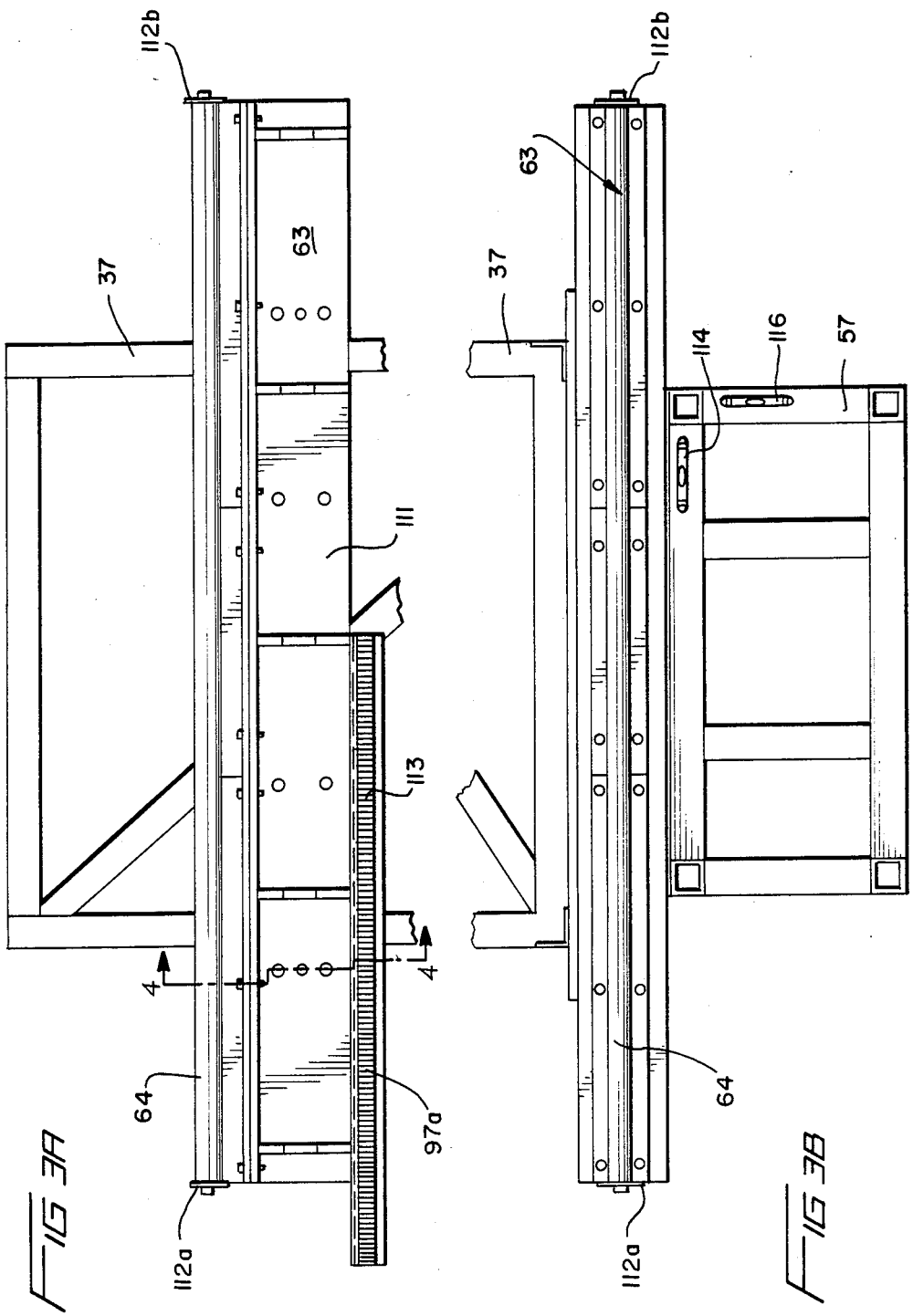
FIGS. 3A and 3B are a front and top plan view of the rail assembly and rack used to laterally move the carriage assembly of the system.

FIGS. 3A and 3B illustrate in detail the upper rail assembly 63 for the outer frame 57. This rail assembly 63 (as well as each of the other rail assemblies 65, 73 and 75 within the carriage assembly 55) includes a support beam 111 for securing and supporting its respective rail 64 in a level, horizontal position. Additionally, the rail 64 (as well as rails 66, 74a, 74b, and 76a, 76b) includes a pair of stop members 112a, 112b on either side to prevent the linear bearing blocks engaged thereto from sliding off. As is best seen with respect to FIG. 3A, the aforementioned rack 97a is secured along the bottom edge of the support beam 111 in the position shown.

Turning now to FIG. 3B, the top surface of the outer frame of the carriage assembly 55 includes both an X bubble-level 114, and a Y bubble-level 116. The provision of the bubble-levels 114, 116 on top of the outer frame 67 allows the system operator to determine whether or not the outer frame 57 has been accurately placed into a level position. If the outer frame 57 were not so positioned, the hydraulic motors 87, 102 of the X and Y motion drive assemblies 85, 100 would experience different frictional resistances in moving the outer frame 57 back and forth on the upper and lower rail assemblies 63, 65, and in moving the inner frame 67 in forward and reverse directions on the rail assemblies 73, 75. These differences in frictional resistances could adversely affect the accuracy of the carriage assembly 55 in positioning the contractable collet 7 of the rod handler 3 over a specific rod in a nuclear fuel rod assembly. Accordingly, the provision of the bubble-levels 114, 116 is important.

Figure 4:
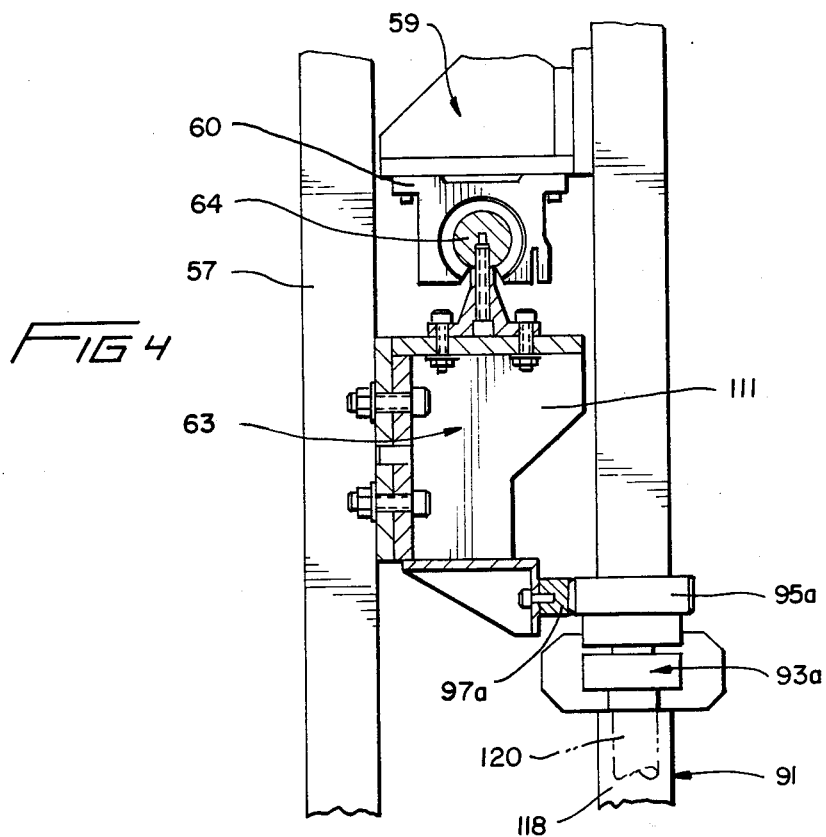
FIG. 4 is a cross-sectional side view taken across line 4—4 of the rail assembly illustrated in FIG. 3A.

FIG. 4 is an enlarged view of cross-section 4—4 of FIG. 3A, and illustrates how the substantially circular cross-section of the rail 64 is snugly received within a semicircular recess within bearing block 60. Additionally, FIG. 4 illustrates how the pinion 95a mounted onto the end of the drive shaft 91 engages its respective rack 97a.

With reference back to FIGS. 1, 2A and 2B, one of the significant structural features of both the outer frame 57 and the inner frame 67 of the carriage assembly 55 is that each of these frames 57, 67 presents a substantially similar profile to the surrounding water, whether it is moved laterally along the X axis, or forward and back along the Y axis. Accordingly, the amount of fluid "drag" which the outer frame 57 experiences along the X axis is substantially the same in either direction, as is the amount of fluid "drag" experienced by the inner frame 67 in moving in either a forward or reverse direction along the Y axis. This feature is significant, in view of the fact that the provision of an asymmetrical profile could result in substantially different amounts of fluid drag in different directions along either the X or Y axes, which in turn could interfere with the ability of the carriage assembly 55 to accurately position the contractable collet 7 of the rod handler 3 over a desired fuel rod in either of the work stations 16 or 18.

Figure 5:
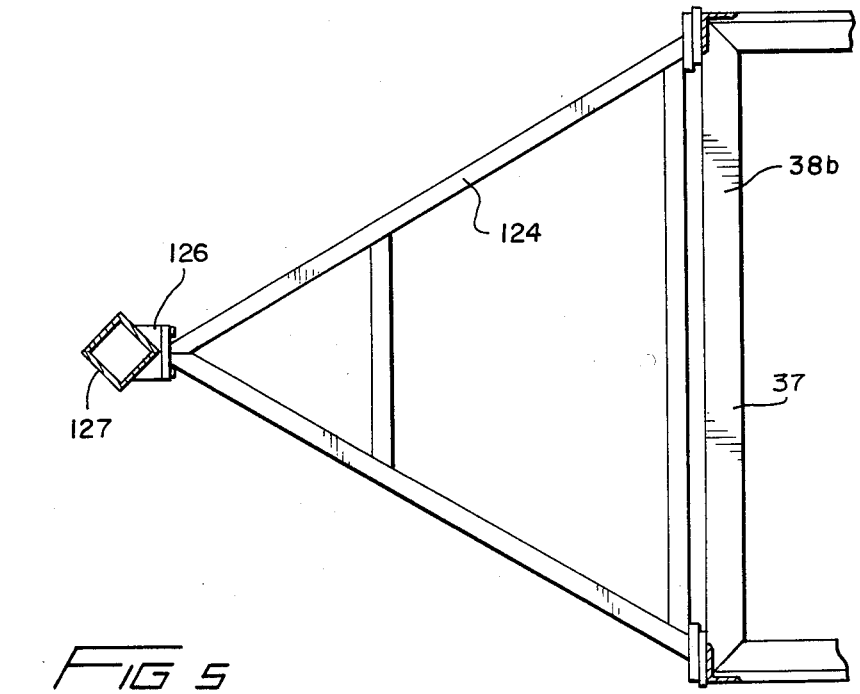
FIG. 5 is a top plan view of the leveling and securing strut used to connect the frame assembly with the work stations.

FIG. 5 illustrates a triangular leveling and securing strut 124 which mechanically connects the lower frame half 38b to the strongback 127 of the centrally disposed work station 20. The sides of the triangular strut 124 are connected to the sides of the front face of the lower frame half 38b. The tapered end of this strut 124 is secured onto the angular side of the strongback 127 of the work station 20 by means of a connecting assembly 126. Because strongback 127 is interconnected with the strongbacks 22, 24 of the work stations 16, 18 (as is evident from FIG. 6), the provision of a rigid, mechanical link between the frame assembly 37 and the work stations 16, 18 and 20 mutually rigidifies and reinforces both structures, which in turn helps minimize the probability that sag (or some other adverse mechanical force) will interfere with the level alignment of the outer and inner frames 57, 67 of the carriage assembly 55 during operation.

FIGS. 6 and 7 illustrate the top frame plates 131, 133 and 136 and the bottom frame plates 144, 146 and 148 of the work stations 16, 18 and 20, respectively. In each case, the rectangular top and bottom frame plates 131, 133, 136 and 144, 146, 148 are connected at one corner to the strongbacks 22, 24 and 27, and at an opposing corner to the support columns 23, 25 and 129. In its lower right-hand corner, top frame plate 131 of work station 16 includes a support flange 132 which is mechanically secured onto the support column 129 of work station 20. Similarly, in its upper left-hand corner, top frame plate 133 of work station 18 includes a support flange 134 which is mechanically secured onto the strongback 127 of work station 20. Electro-micrometers 135a, 135b are also mechanically mounted on the upper surfaces of the top frame plates 131, 133. These electro-micrometers 135a, 135b are electrically connected to the microcomputer 402 of the control circuit 400, and are used to provide reference points for the location of the contractable collet 7 of the rod handler 3 during the first steps of the general operating routine of the system 1. The electro-micrometers 135a, 135b perform their function by generating an electric signal when the collet 7 of the rod handler 3 interacts with the local magnetic field that these devices generate.

With reference back to FIG. 1, the stongbacks 22, 24 of each of the work stations 16, 18 include seven receiving angles 26a-26g and 28a-8g, spaced so as to receive the corners of the seven grids in a nuclear fuel rod assembly when such a fuel assembly is lowered through the central square openings in the top frame plates 131 and 133. Directly opposite each of the receiving angles 26a-26g and 28a-28g are a set of hydraulically-actuated clamp angles 30a-30g for positioning and securing the grids of a nuclear fuel rod assembly within the receiving angles 26a-26g and 28a-28g.

In contrast to work stations 16 and 18, work station 20 includes only two hydraulic clamps 138a, 138b (of which only clamp 138a is visible) for securing a stainless steel fuel rod canister or cask 140 therein. The primary function of the work station 20 is not to position a fuel rod assembly per se, but to position only the rod canister 140 which may be used either to hold new fuel rods for use during a reconstitution operation, or to receive damaged fuel rods during either a reassembly or reconstitution operation. The fuel rod canister 140 contains a divider plate 142 which divides the interior thereof into four separate compartments, and is covered by a spacer plate 143 with regularly arranged, rod receiving bores for uniformly spacing the rods it holds.

FIG. 7 illustrates the bottom frame plates 144, 146 and 148 of the work stations 16, 18 and 20. In each of these frame plates the strongbacks and support columns 22, 23, 24, 25, and 127, 129 of each of the work stations 16, 18 and 20 are securely welded thereto at joints 150, 152, 154, 156, and 158, 160, respectively. Additionally, the bottom frame plate 144 of work station 16 has a mechanical clamping assembly 162 for securing the bottom nozzle (not shown) of a nuclear fuel rod assembly to the plate 144. This mechanical clamping assembly 162 includes four extendable tongues 164a-164d which may be selectively extended or retracted. The typical bottom nozzle of a nuclear fuel rod assembly includes a set of grooves on the insides of its corners (not shown) which may receive the extendable and retractable tongues 164a-164d when a fuel rod assembly is placed directly over the clamping assembly 162. The clamping assembly 162 provides the operator with a means to positively test the tensile strength of the joints connecting a newly installed top nozzle onto a reconstituted fuel assembly by allowing the fuel assembly to be locked down while a tensile force of a known magnitude is applied to the newly-installed top nozzle. Finally, each of the bottom frame plates 144, 146 and 148 includes a plurality of bolts 166a-166d, 168a-168d, and 170a-170d for securing these plates to the base plate.

FIGS. 8A and 8B illustrate the rod handler 3 of the system 1. As has been previously indicated, this rod handler 3 includes a rod gripping assembly 5 having a contractable collet 7 and an elongated tubular housing 9 into which the contractable collet 7 may withdraw a fuel rod 602 prior to any movement on the part of the carriage assembly 5. The handler 3 further includes the aforementioned hydraulic motor 11 which withdraws or lowers selected fuel rods 502 into or out of the tubular housing 9. A lifting bail 13 is provided which allows a bridge crane (not shown) to easily lift or lower the rod handler 3 onto or away from the upper and lower mounting plates 78, 80 on the inner frame 67 of the carriage assembly 55. Finally, a strongback 15 is provided in order to rigidify the tool and to mechanically interconnect its major mechanical components.

Turning specifically now to FIGS. 8A and 9, the lower end of the strongback 15 of the rod handler 3 includes a duckbill mechanism 178 for guiding the collet 7 of the gripping assembly 5 over the end of a selected fuel rod. The duckbill mechanism 178 achieves its function by means of a pair of opposing, semicircular guide members 180a, 180b, each of which includes a semiconical recess 182 in its interior. The two semicircular guide members 180a, 180b are linked together on one side by means of a scissors-type pivot joint 184, which allows the guide members 180a, 180b to capture or release the gripping assembly 5. The opening and closing of the scissors-type pivot joint 184 is controlled by a hydraulic cylinder 187 having a piston rod 188 which is mechanically linked to the scissors-type pivot joint 184. As is evident in both FIGS. 8A and 9, the hydraulic cylinder 187 is in turn supported by means of an L-shaped bracket 190 which is mechanically connected at its bottom end to a support rod 193. Support rod 193 is in turn connected to another hydraulic cylinder 195 mounted onto the floor of a generally rectangular support backet 198 attached to the lowermost end of the strongback 15. The hydraulic cylinder 195 is capable of withdrawing or extending the duckbill mechanism 178 toward or away from the gripping assembly 5. In order to allow the hydraulic cylinder 195 to completely withdraw the duckbill mechanism 178 away from the gripping assembly 5 without mechanical interference, the front plate 199 of the rectangular support bracket 198 is provided with a square opening 200. This opening 200 allows most of the duckbill hydraulic cylinder 187 to be withdrawn into the hollow interior of the rectangular support bracket 198.

With specific reference now to FIGS. 9 and 10, the gripping assembly 5 includes a sleeve member 203 which is freely slidable over the outer surface of the collet 7. Specifically, sleeve member 203 includes a sleeve section 204 in its lower portion, and a cylindrical mounting section 205 in it upper portion. Although not specifically shown in any of the several figures, the collet 7 includes four longitudinal slots radially spaced approximately 90° from each other. These slots define four spring-loaded fingers around the circumference of the collet 7 which normally radially extend a small distance outwardly from one another. The collet interior 208 is slightly frusto-conical in shape when the sleeve section 204 of the sleeve member 203 is in a retracted position relative to the outside of the collet 7. The slightly frustro-conical interior 208 of the collet 207 can easily receive the end of a fuel rod 502 when the collet 7 is lowered over an end thereof. However, when the sleeve section 204 is extended over the exterior surface of the collet 7 in the position shown in FIG. 10, the spring-loaded fingers of the collet 7 radially contract and tightly engage the circumference of the fuel rod 502, thereby gripping it.

The upper end of the collet 7 includes a centrally disposed, threaded bore 209 as shown. The plunger rod 210 of a "fuel rod present" detector extends through the threaded bore 209 of the collet 7 and into the collet interior 208. As will be discussed in more detail hereinafter, the plunger rod 210 is mechanically engaged to a linear variable differential transformer 383 (hereinafter referred to as LVDT 383) located in the collet extension and locking assebly 275 located near the upper portion of the rod handler 3. The upper end of the plunger rod 210 is spring-loaded within the LVDT 383. However, when the end of a fuel rod 502 depresses the plunger rod 210 upwardly, it causes LVDT 383 to transmit an electric signal to the control circuit 400 of the system 1 indicating that a fuel rod 502 is present within the interior 208 of the collet 7. In the preferred embodiment, LVDT 383 (as well as LVDTs 299a and 299b) are Model No. 1000-HCA type LVDTs manufactured by the Schaevitz Company of Camden, N.J. As is best seen with respect to FIG. 10, the plunger rod 210 is both located within, and slidably movable within, a centrally disposed bore in an inner sleeve 214. The lower end 216 of the inner sleeve 214 is threaded, and screws into the threaded bore 209 of the collet 7 as indicated. In order to reinforce the threaded engagement between the end 216 of the inner sleeve 214 and the bore 209 of the collet 7, a lock nut 219 is threaded over the end 216 of the inner sleeve 214 and into abutment with the upper end of the collet 7. In order to allow a relative sliding motion between the collet 7 and the sleeve member 203, the unthreaded portion of the inner sleeve 214 is slidably movable within a centrally disposed bore 222 located along the longitudinal axis of the cylindrical mounting section 205 of the sleeve member 203.

The uppermost portion of the cylindrical mounting section 205 of sleeve member 203 is threaded, and screwed into the threaded interior of an outer sleeve 230. An annular spacer 228 preferably circumscribes the loewr end of the threaded exterior 224 in order to arrest the extent to which the threaded exterior 224 may be screwed into the interior of the outer sleeve 230. The outer sleeve 230 is welded onto an elongated track member 232 having a plurality of uniformly spaced teeth 234. As will be described in detail hereinafter, it is the outer sleeve 230 which exerts the tensile force necessary to withdraw a fuel rod 502 into the cylindrical housing 9 when the pinion of the hydraulic motor 11 located in the motor mounting assembly 265 of the rod handler 3 pulls the rack 232 upwardly.

Referring again to both FIGS. 9 and 10, the tubular housing 9 includes a plurality of guide spacers 237 for maintaining the concentricity of the outer sleeve 230 during a rod lifting or lowering operation. Additionally, a plurality of lead-in bearings 240a, 240b are included within the tubular housing 9 in order to prevent the outer sleeve 230 from binding or catching against its interior surface when the hydraulic motor 11 extends it downwardly. Finally, in order to permit the system operator to visually monitor both the duckbill extension and retraction process and the lowering and lifting of the gripping assembly 5, a television camera 243 is provided within the system which is suspended in place by means of a bracket 245 mounted onto the strongback 15. The tubular housing 9 is rigidly but rotatably mounted in parallel relationship to the strongback 15 throughout its length by means of a plurality of housing bracket assemblies 248a–248c.

With specific reference now to FIG. 8b, which illustrates the upper portion of the rod handler 3, the housing 9 is rotatably mounted onto the horizontally disposed mounting plate of the housing bracket assembly 248c by means of a ring 250 whose interior diameter is preferably circumscribed by ball bearings. A cam ring 252 is fixed around the periphery of the tubular housing 9 over the mounting ring 250. The ear 254 of the cam ring 252 is connected to a pivotable joint 256 which in turn is joined to a manually extendable arm 258 slidably movable within a guide sleeve 260 by means of a cable 262. The cable 262 extends to the deck (not shown) which is normally present over a cask-loading shaft in the spend fuel area of a nuclear plant. The provision of a manually extendaable arm 258 connected to the ear 254 of a cam ring 252 allows the system operator to rotate the tubular housing 9 by as much as 20° when attempting to either align a slightly bent fuel rod into a selected rod-receiving space in the grids of a nuclear fuel rod assembly, or to pull a bent rod out of a grid.

The upper portion of the rod handler 3 also includes a motor mounting assembly 265 for mounting the previously mentioned hydraulic motor 11, a sled assembly 270 which "breaks" with the upper end of the tubular housing 9 at point 272 and includes a pair of parallel rails 273a, 273b, and a collet extension and locking assembly 275 for positively extending and locking the expandable fingers of the collet 7 over the end of a selected fuel rod 502.

With reference now to FIGS. 8B and 11, the motor mounting assembly 265 includes a base plate 280 which is rigidly connected to the top of the tubular housing 9 in an accurately level position by means of four support flanges 282a–282d. The motor mounting assembly 262 further includes a resiliently mounted, "floating" motor plate 289 which supports both the hydraulic motor 11, and an electric encoder 285 which is mechanically connected to the output shaft of the motor 11 and electrically connected to the control circuit 400. The encoder 285 generates an electrical signal indicative of the extent to which the hydraulic motor 11 has raised or lowered the outer sleeve 230. On its front side, plate 289 is mechanically connected to the base plate 280 by a pair of spring-loaded bolt assemblies 296a, 296b. On its back side, plate 289 is connected onto the upper, annular flange 287 of a ball bushing 288 which is freely slidable over the outside surface of the tubular housing 9. As is best seen with reference to FIG. 11, a pair of brackets 291a, 291b secure the annular flange 287 of the bushing 288 to the bottom of the mounting plate 289. The motor mounting plate 289 also supports a pair of LVDTs 299a, 299b whose plunger rods 301a, 301b are mechanically connected to the accurately level base plate 280. The LVDTs 299a, 299b detect any relative movement along the Y direction between the rigidly mounted base plate 280 and the resiliently mounted, "floating" motor plate 289, since any such movements will withdraw or extend the plunger rods 301a, 301b into or out of the bodies of the LVDTs 299a, 299b. Like the electric encoder 285, the outputs of the LVDTs 299a, 299b are electrically connected to the control circuit 400 of the system 1. The outputs of the LVDTs 299a, 299b may be used to determine whether or not the hydraulic motor 11 is applying an excessive amount of tensile or compressive force onto a fuel rod 502 engaged to the outside sleeve 230 by the gripping assembly 5. As will be discussed in detail hereinafter, the microcomputer 402 of the control circuit 400 is programmed to deactuate the hydraulic motor 11 when it receives a signal from the LVDTs 299a, 299b which indicate that the hydraulic motor 11 is applying an excessive tensile or compressive force onto a fuel rod 502. As is best seen in FIG. 8B, the motor mounting plate 289 supports the hydraulic motor 11 through a pair of parallel motor brackets 304a, 304b. Additionally, the output shaft 307 of the hydraulic motor 11 is secured in concentric relationship to a pinion 310 circumscribed by gear teeth which are meshable with the teeth 234 of the rack 232. A crescent-shaped slot 311 cut through the upper portion of the tubular housing 9 allows the pinion 310 to mesh with the rack 232.

The tubular housing 9 terminates in a ring member 312 which is secured thereon by means of a set screw 313 (visible in FIG. 120. While in FIG. 11 the upper end of the tubular housing 9 appears to be connected to, and continuous with, the cylindrical housing 370 of the collet extension and locking assembly 275, the tubular housing 9 is in fact separable from the cylindrical housing 370 at point 272. In other words, the outer sleeve 230 will lift the cylindrical housing 370 completely off the ring member 312 when the pinion 310 of the motor 11 rotates in such a way as to drive the rack 232 upwardly. When this occurs, the sled assembly 270 is pushed upwardly by the end of the outer sleeve 230 in a manner which will become clear presently.

With reference still to FIGS. 8B and 11, the sled assembly 270 generally includes the previously mentioned set of parallel rails 273a, 273b which are rigidly mounted along the longitudinal axis of the strongback 15 in the positions shown. The upper and lower ends of the rails 273a, 273b are capped by upper and lower stop members 316a, 316b and 318a, 318b, respectively. A sled plate 325 is slidably attached to the rails 273a, 273b through a pair of upper and lower linear bearings 320a, 320b and 322a, 322b, as illustrated. The stop members 316a, 316b and 318a, 318b limit the extent to which the sled plate 325 vertically moves along the rails 273a, 273b. With specific reference now to FIG. 11, the sled assembly 275 includes a sled plate locking mechanism in the form of a tapered locking pin 327 which may be extended and retracted from the strongback 15 by actuating or deactuating hydraulic cylinder 330. While not specifically illustrated in any of the several figures, the sled plate 325 includes at least two bushings spaced along its vertical axis into which the tapered locking pin 327 may be received when the plate 325 is at its uppermost and lowermost positions, with linear bearings 322a, 322b abutting stop members 316a, 316b, 318a, 318b, respectively. The ability to secure the sled plate 325 into such uppermost and lowermost positions is important, as will become evident when the operation of the system 1 is described in detail hereinafter.

Mounted over the sled plate 325 is a connector plate 333. As was the case between the previously described base plate 280 and motor mounting plate 289, the mounting plate 340 is resiliently mounted over the connector plate 333 by means of four spring-loaded bolt assemblies 336a–336d. The use of a resilient (as opposed to a rigid) mounting means between the connector plate 333 and the sled plate 325 helps absorb the small but significant amounts of mechanical shock exerted on the system 1 whenever the hydraulic motor 11 raises or lowers a fuel rod 502, and raises and lowers all the various components of the sled assembly 270. Orthogonally mounted onto the connector plate 333 is a horizontally disposed mounting plate 340. Mounting plate 340 mechanically connects the sled assembly 270 with the collet extension and locking assembly 275, as will become evident presently.

With reference now to FIGS. 8B, 11 and 12, the collet extension and locking assembly 275 is formed from a normally extended hydraulic cylinder 245 which, when retracted into the position shown in FIG. 11, will extend the collet 7 into a gripping position over the end of a fuel rod 502. The collet-extending hydraulic cylinder 345 includes an output rod 346 connected to a bracket plate 350 by means of an adjustable coupler 348. To limit the stroke of the operating rod 346 of the cylinder 345, a stop mechanism 243 is provided which includes a rod 355 having nuts 357, 359 screwed onto its upper and lower ends, respectively. The rod 355 is freely slidable within a sleeve 361 which extends through, but is rigidly attached to, the mounting plate 340. Similarly, a stopping bolt 365 is secured onto the right-hand side of the mounting plate 340 in order to precisely limit the distance to which the front edge of the bracket plate 350 may come to the upper surface of the front edge of the mounting plate 340. This, in turn, limits the extent to which the collet 7 may be extended downwardly by the hydraulic cylinder 345. It should be noted that the hydraulic cylinder 345 is a retractable (as opposed to an extendable) type cylinder; consequently, the bracket plate is normally in the extended position indicated in phantom in FIG. 11. It is only when the cylinder 345 is positively retracted in order to extend the collet 7 over the end of a fuel rod 502 that the bracket plate 350 assumes the lowermost position illustrated in FIG. 11.

FIG. 12 is a front, partial cross-sectional view of the collet extension and locking assembly 275. This figure clearly illustrates the separation point 272 between the bottom of the cylindrical housing 370, and the upper surface of the ring 313 which caps the top of the tubular housing 9. This figure also shows a second separation point 351 between the bottom of the bracket plate 350, and the top of the cylindrical housing 370. A ring-shaped bumper 371 is mounted on top of the cylinderical housing 370 to absorb shock when the bracket plate 350 is pulled down against the top of the cylindrical housing 370 during a collet extension operation. The interior 371 of the cylindrical housing 370 is cylindrical, as indicated. In order to maintain a concentric alignment between the outer sleeve 230 and the cylindrical interior 373 of the cylindrical housing 370 as the sleeve 230 reciprocates therein, an annular bushing 375 is attached over the top of the sleeve 230 by means of a set screw 377. This bushing 375 also allows the outer sleeve 230 to be secured in a collet-locking position by the lock pins 387a, 387b of the locking cylinders 385a, 385b, respectively. In order to secure the inner sleeve 214 to the bracket plate 350, a bore (not shown) is provided in the bracket plate 350 for receiving the upper end of the sleeve 214. The sleeve 214 is positively secured onto the plate 350 by means of two sets of lock nuts 379, 381 which threadedly engage upper and lower threaded portions 382a, 382b on the upper portion of the inner sleeve 214 in the positions illustrated. Located above the end of the inner sleeve 214 is the previously mentioned plunger rod 210, which is mechanically connected to the interior of LVDT 383 which forms the balance of the previously mentioned "rod present" detectors. When the bottom end of the plunger rod 210 is pushed upwardly by the presence of a fuel rod 502 within the interior of the contractable collet 7, the LVDT 383 generates an electrical signal indicative of a "rod present" condition, and transmits this signal to the control circuit 400 of the system 1.

In understanding the specific operation of the collet extension and locking assembly 275, three principles should be borne in mind. First, as the hydraulic motor 11 raises and lowers the outer sleeve 230, the bushing 375 at the end of the sleeve normally bears against the underside of the bracket plate 350 in the phantom position illustrated in FIG. 11, due to the weight of the free-sliding sled assembly 270. Secondly, when the bushing 375 bears against the underside of the bracket plate 350 in the phantom position, the sleeve section 204 of the sleeve member 203 is retracted away from the outside surface of the collet 7. Accordingly, the collet 7 is in an expanded, rod-receiving state when the bushing 375 bears against the underside of the bracket plate 350. Thirdly, as is clear from FIG. 11, since the inner sleeve 214 is threadedly engaged onto the end of the collet 7, the reciprocation of this sleeve 214 by the hydraulic cylinder 345 through the bracket plate 350 will either extend or withdraw the collet 7 toward or away from a particular fuel rod 502.

After the carriage assembly 55 moves the tubular housing 9 over the grid coordinates of a particular fuel rod 502 to be gripped, the hydraulic motor 11 drives the outer sleeve 230 down to a point where the mouth of the collet 7 is only a few inches above the end of the fuel rod 502 to be gripped. When this occurs, the entire sled assembly 270 follows the outer sleeve due to its weight, and there is no relative motion between the outer sleeve 230 and the inner sleeve 214. Because the bushing 375 bears against the underside of the bracket plate 350 throughout this section of the operation, the collet 7 remains in an expanded position with the sleeve section 204 of the sleeve member 203 located above the collet 7. Next, the previously mentioned hydraulically actuated tapered pin 370 is then extended into a bushing (not shown) in the sled plate 325 in order to lock the sled plate into its lower most position, with the bearings 322a, 322b of the sled plate 325 resting against the lower stop members 318a, 318b of the rails 273a, 273b. During this time, the hydraulic cylinder 345 has been in an unactuated, extended position. Consequently, there is a gap of approximately two and a half inches between the bottom side of the bracket plate 350 and the bumper 371 which is mounted on top of the cylindrical housing 370. In order to lower the collet 7 into a rod-gripping position over the end of a selected fuel rod 502, the hydraulic cylinder 345 is actuated, thereby retracting the operating rod 346, which brings the bracket plate 350 to bear against the bumper 371 in the position shown in FIG. 12, and also to extend the collet 7 downwardly over the rod 502 by moving it downwardly about two and a half inches. When this occurs, the outer sleeve 230 will not follow the downward motion of the inner sleeve 214 due to the frictional resistance the pinion 310 of the hydraulic motor 11 exerts onto the rack 232 welded onto the outer sleeve 230. Accordingly, the bushing 375 will remain in the phantom position illustrated in FIG. 12 during the collet-extending stroke of the hydraulic cylinder 245.

In order to contract the collet 7 over the end of the fuel rod 502 into a gripping position, the hydraulic motor 11 is momentarily actuated in order to drive the outer sleeve 230 downwardly about two and a half inches. This will drive the sleeve portion 204 of the sleeve member 205 over the outside surface of the collet 7, thereby contracting it into a gripping position over the fuel rod 502. It should be noted that the control circuit 400 will not allow the hydraulic motor 11 to be actuated during this step unless the "rod present" detector formed from the plunger rod 210 and the LVDT 383 generates and transmits a "rod present" signal. In order to lock the collet 7 in this gripping position, the two locking cylinders 385a, 385b are actuated, which drives their respective lock pins 387a, 387b over the top of the bushing 375, as is indicated in phantom in FIG. 12. Thus secured, the system 1 is now poised to lift the fuel rod 502 which the elongated housing 9 in order to insert it into another fuel rod assembly, or into the rod canister 140 secured within work station 20. A more specific description of the other process step associated with the system 1 will be given hereinafter.

In an alternate embodiment of the collet extension and locking assembly 275, the bushing 375 is secured within the top of the cylindrical housing 370 in the position indicated in phantom in FIG. 12. Additionally, the structure of the collet 7 and the sleeve member 203 is modified so that the sleeve portion 204 of the sleeve member need travel downwardly only about a quarter of an inch in order to contract the mouth of the collet 7 into a locking position. Finally, the hydraulic cylinder 345 is replaced with an extendable (as opposed to a retractable) cylinder with a very short operating stroke of only about a quarter of an inch. In the operation of this alternative embodiment, the hydraulic motor 11, rather than the cylinder 345, is used to position the mouth of the collet 7 over the fuel rod 502, and the alternative, short-stroke extendable cylinder 345 is used to implement the collet contracting step by pulling the collet upwardly into the sleeve portion 304 of the sleeve member 203 about a quarter of an inch. Such an alternative embodiment is somewhat simpler both in structure and in operation than the previously described embodiment. Additionally, the user of the hydraulic motor 11 (instead of the hydraulic cylinder 345) to lower the collet 7 of the fuel rod affords the operator of the system 1 more control over this relatively delicate step in the operation of the system 1.

With reference now to FIG. 13, the control circuit 400 of the system 1 generally comprises a main computer 402 whose input side is connected to an interface circuit 403. In the preferred embodiment, the main computer 402 is a Model 9836 microcomputer manufactured by Hewlett-Packard Corporation located in Palo Alto, Calif. The interface circuit 403 is a Model 3BCD type interacing circuit which is likewise manufactured by Hewlett-Packard Corporation. The interface circuit 403 is electrically connected to the digital outputs of the previously described X, Y and Z encoders 89, 104 and 205, and to a plurality of magnetic switches 410a–410f which are mechanically connected in a conventional fashion to the duckbill guide closing and opening cylinder 187, the duckbill assembly retraction and extension cylinder 195, the sled-locking cylinder 330, the collet extension cylinder 345, and the outer sleeve locking cylinders 385a, 285b. Each of these magnetic switches 410a–410f changes state whenever its respective hydraulic cylinder is either actuated or deactuated. Interface circuit 403 is also connected to a separate interface computer 404 having a digital-to-analog converter. The analog signals generated by the electromicrometers 135a, 135b mounted on the top frame plates of the work stations 16, 18 as well as the tensile and compressive force monitoring LVDTs 299a, 299b are connected to the input side of the interface computer 404, as is the analog signal generated by the "rod present" LVDT 383. The interface computer 404 converts these analog signals to digital signals and transmits the digital signals to the main computer 402. In the preferred embodiment, the interface computer 404 is a Model 8840A single board computer manufactured by Intel Corporation of Palo Alto, Calif. The interface computer 404 further includes an Intel Model 328 digital-to-analog converter.

The output side of the main computer 402 is connected to another interface circuit 407, which is preferably a Model IEE-488 interface circuit manufactured by the previously mentioned Hewlett-Packard Corporation. This circuit 407 is in turn connected to a printer 408. The output of the main computer 402 is further connected to the digital-to-analog converter of interface computer 404 as indicated, in order to convert its digital output into an analog output, which can modulate the proportional air valves 415a–415h. These air valves in turn regulate the amount of pressurized air which may flow into the input of the Z, X and Y hydraulic motors 11, 87 and 102, the previously mentioned duckbill mechanism cylinders 187, 195, the sled-locking cylinder 330, the collet extension cylinder 345, and the outer sleeve lock cylinders 385a, 385b.

FIGS. 14A and 14B are a flow chart of the general routine which the main computer 402 implements in operating the system 1. After the computer 402 is actuated at the "start" step 425, it proceeds to the calibration step 427 in order to relate the pulses received from the X, Y and Z motion encoders 89, 104 and 285 to specific grid coordinates over the work stations 16, 18 and 20. Generally, this step entails manipulating the collet 7 over the previously mentioned electromicrometers 135a, 135b in order to establish X, Y and Z "origin points" in the corners of the top frame plates of these work stations 16, 18. In performing this step, the collet 7 is first positioned as closely as possible over the center of the electromicrometer 135a positioned in the corner of the top frame plate 131 of work station 16. As soon as this first "origin point" is located, the computer 402 starts keeping count of the number of pulses generated by the X, Y and Z encoders 89, 104 and 285, each of which produces 1,000 pulses per inch of movement. This operation is repeated with respect to the electromicrometer 135b located in the corner of the top frame plate of work station 16. As will be seen presently, the introduction of these "origin points" for both work stations 16 and 18 will allow the computer 402 to interpolate how many pulses in the encoders 89, 104 it must receive before collet 7 is positioned over a selected grid locatoin in any of the work stations 16, 18 or 20.

In program step 429, the program parameters are initialized. Generally, this encompasses entering specific values into the program for variables such as how much tensile or compressive force must be detected by the LVDTs 299a, 299b before the computer 402 shuts off the rod handler motor 11. This step further entails checking to see whether or not there is proper communication between the interface circuits 403, 404 with the main computer 402. Once this has been accomplished, the program operator enters and verifies the identification numbers of the particular fuel rod assemblies being reassembled or reconstituted, as indicated in step 431. This is basically a "bookkeeping" step, taken as part of the overall inventory control system of fuel rods which all nuclear plants must have.

In program step 432, rod location tables (or grid coordinates) are reconstructed, if necessary. In most instances, grid location tables for every rod location in a standard grid will already be present in the memory of the computer 402. This step is only implemented if the operator is dealing with fuel rod assemblies having grids which are of different size than the grids last worked with, or grids which are not completely filled with (or empty of) fuel rods, such as fuel assemblies in which a few rods have been already moved.

In question block 434, the computer 402 asks the operator whether or not he wishes to proceed to move a fuel rod. Step 433 is designed to give the system operator an opportunity to easily "abort" the operation, should he choose not to remove fuel rods from a fuel rod assembly at that time. If the operator's answer is "no", the computer 402 proceeds to the "complete sequence" block 436, proceeds to shut itself down, and thence to process step 438, wherein it retracts the rod handler 3 into a "park" (or uppermost) position on sled 270, where it is locked by the tapered pin 327 by the action of hydraulic cylinder 330. The program then proceeds to "stop" block 439, and shuts the computer 402 down. However, if the operator's answer to the question posed in question block 434 is "yes", the computer 403 proceeds to step 440. Here, the operator must decide which specific fuel rods it wishes to remove from one of the fuel rod assemblies, and where it wishes to insert these fuel rods with respect to the various grid locations in the work stations 16, 18 and 20. Accordingly, the operator enters "extract" grid coordinates and "insert" grid coordinates which correspond to these desired locations.

Immediately after step 440 has been performed, the computer 402 gives the operator an opportunity to make corrections in the newly entered "extract" and "insert" coordinates by asking whether or not the operator wishes to change any of these locations, as is indicated by question block 442. If the answer to this question is "yes", the computer 402 proceeds to block 444, and allows the operator to enter corrected "extract" and "insert" coordinates. However, if the answer to this question is "no", the computer 402 proceeds to step 446, and computes the number of pulses it must receive from the X and Y encoders 89, 104 in order to locate the collet 7 over the desired "extract" and "insert" coordinates. Because the computer 402 "knows" the exact dimensions of the grids of the fuel rod assemblies being reconstituted or reassembled, and because it known where the corners of these grids are located by virtue of the "calibrate system" step 427, it may easily compute these coordinates by simple interpolation.

After calculating all of the desired X, Y coordinates, the computer 402 proceeds to step 448, and moves the rod handler 3 into the first "extract" location. Immediately thereafter, the computer 402 asks the operator, in question block 450, whether or not the rod handler 3 has been moved over the grid coordinates corresponding to the first "extract" position. The operator responds by comparing the actual number of pulses generated by the X and Y encoders 89 and 104 with the computed number of pulses (stored in the computer's memory) necessary to bring the collet 7 over the first desired "extract" coordinates. If the number of pulses for both the X and Y coordinates in materially different, the operator answers the question in block 450 negatively, and the computer 402 proceeds to step 452 of the program, which allows the operator to make whatever adjustments are necessary to bring the actual pulses generated by the encoders 89 and 104 into conformity with the computed number of pulses necessary to arrive at the desired "extract" coordinates. However, if the answer to this question is "yes", the computer 403 then proceeds to block 453 and extracts the desired fuel rod in accordance with the subroutine illustrated in FIG. 15 (which will be described in more detail hereinafter).

After the fuel rod has been extracted, the computer 402 gives the operator an opportunity to change the previously programmed "insert" location by asking the question posed in question block 455. If the operator answers this question in the affirmative, the computer 402 gives the operator the opportunity to enter a new "insert" location, as is indicated in block 457. However, if the answer to this question is negative, the computer 402 proceeds to step 459 and computes how many pulses it must receive from the X and Y encoders 89, 104 in order to move the rod over the desired "insert" coordinates.

Next, the computer 402 moves the rod handler 3 into the "insert" location calculated at step 459, as is indicated by process sstep 461. Immediately after performing step 461, the computer 403 proceeds to question block 463 and asks if this first "insert" position is correct. This step is directly analogous to the step associated with the previously described question block 450. Basically, the computer 402 simply compares whether or not the number of pulses actually received from the X and Y encoders 89, 104 correspond with the numbers of pulses which actually correspond to the desired grid coordinates (as computed by the computer 402). If the answer to the question in question block 463 is "no", the computer proceeds to step 464, which allows the operator to make whatever adjustments are necessary to correct the error. However, if the answer to the question in block 463 is "yes", the computer 402 proceeds to step 465 and inserts the fuel rod, and thence to step 467, wherein a record of the insertion is generated by the printer 408. The sequence illustrated throughout this flow chart is repeated until all of the desired fuel rods are moved into their new positions, whereupon the program terminates at step 468.

As the computer 403 implements this general routine, it is important to note that in a reconstitution-type repair, it alternately extracts a rod from a given fuel rod assembly, and then proceeds to replace the extracted rod with a new or salvaged fuel rod in the same location from which the initially-extracted rod was pulled. In other words, it does not normally remove all of the damaged fuel rods from a given fuel assembly in one step, and then proceed to fill the partially empty skeleton with new or salvaged fuel rods in another step. By alternately extracting and inserting fuel rods in the support skeleton being reconstituted, it is able to use all of the fuel rods which surround the empty space left by the extracted fuel rod to help guide the new fuel rod into this space. This is important, in that it helps prevent a fuel rod from being inserted through a set of non-aligned grid apertures in a particular fuel rod assembly. Such an erroneous placement of a rod is very likely to cause the rod to become bound within the grids of the particular fuel rod asembly into which it was inserted. Additionally, in order to maximize the accuracy of the carriage assembly 55 in positioning the collet 7 over a particular grid location, the general routine has an anti-backlash provision which insures that the carraige assembly 55 always appraoches a particular fuel rod assembly from the same direction, just in case the frictional resistances are different for different directions of X or Y movement. Finally, the general routine slows down the speed of the hydraulic motors 87, 102 as the rod handler 3 approaches a desired grid location in discrete steps (i.e., from 20 inches per minute to 15 inches per minute, then to 10 inches, and finally 5 inches per minute).

FIG. 15 illustrates the subroutine used to extract a particular fuel rod. The program starts at step 470, and then proceeds to step 472, whereupon the sled assembly 270 is unlocked by retracting the tapered pin 327 out of the sled plate 325 by means of hydraulic cylinder 330. Next, as indicated by step 474, the computer 402 drives the collet 7 down over the top of the fuel rod by actuating hydraulic cylinder 345. At this juncture, the LVDT 383 connected to the plunger rod 210 should generate a signal indicating that a rod is in a gripping position within the interior of the collet 7. However, if the LVDT 383 generates a signal indicating that the grip depth of the collet 7 over the end of the rod is either too great or too little (i.e., less than a half-inch), the "extract" subroutine will automatically stop. On the other hand, if the LVDT 383 indicates that the grip depth of the rod within the collet 7 is correct, the computer 402 will proceed to step 476, and momentarily actuate the hydraulic motor 11 in order to drive the sleeve member 203 attached to the outer sleeve 230 down over the outside surface of the collet 7 in order to firmly grip the end of the fuel rod. Immediately thereafter, the computer 402 locks the collet 7 into position by actuating the locking cylinders 385a, 385b.

After these steps have been accomplished, the computer 402 proceeds to step 478, and simultaneously activates a "force-check" task while driving the collet 7 up in order to bring the fuel rod within the tubular housing 9 of the system 1. As is indicated by block 479, the task which is simultaneously implemented during this step comprises the steps of monitoring both the tensile force applied to the rod as well as the rod grip depth (i.e., the distance that the fuel rod end pushes the push-rod 210 of the "rod present" detector) by monitoring the signal received from LVDTs 299a, 299b and 383. If either the tensile force or the grip depth falls outside of the values of the parameters initially inserted into the main routine at step 429, the subroutine will automatically stop. However, if these values remain within their preprogrammed limits, the computer 402 will proceed to step 480, and lock the sled assembly 270 in its uppermost position by actuating the cylinder 330 to drive the tapered pin 327 into a pin-receiving aperture (not shown) present in the sled plate 325. The subroutine then stops, as indicated in step 481.

FIG. 16 illustrates the subroutine used to insert the fuel rods. The computer 402 initiates this subroutine at step 485, and then proceeds to step 487. At block 487, the computer 403 actuates hydraulic cylinder 195 in order to position the duckbill assembly 178 adjacent the gripping assembly 5 with its guide members 180a, 180b open. After this has been accomplished, the computer 402 closes the guide members 180a, 180b of the duckbill assembly 178 in step 489.

Next, the computer 402 unlocks the sled assembly 270 as indicated in step 491 by retracting the tapered pin 327 out of the sled plate 325 by hydraulic cylinder 330. Immediately thereafter, the computer 402 proceeds to step 492, and simultaneously commences the force-track tasks enumerated in step 493, while lowering the collet 7 down by actuating hydraulic motor 11. As is indicated in step 493, the collet 7 and its fuel rod are driven down by the hydraulic motor 11 in accordance with a procedure designed to accurately "thread" the rod through the mutually registering apertures of the fuel rod assembly being loaded. Specifically, the hydraulic motor 11 momentarily stops the fuel rod just before it enters the desired aperture on the grid, waits five seconds, and then drives the rod through the grid at a rate of 20 inches per minute. After the end of the rod has been successfully extended through the grid, the hydraulic motor 11 speeds up to drive the rod in front of the next grid at a rate of 15 feet per minute in order to minimize the time required for the insertion process. The rod is then stopped for five seconds, and this process is repeated until the rod is finally threaded through the seventh grid of the fuel rod assembly. The use of such a procedure eliminates or at least minimizes vibrations within the grids which could cause a malignment of the rod-receiving apertures to occur during the insertion process. In order to insure that the rod is being properly inserted in a set of mutually aligned, rod-receiving apertures in the grids, the amount of compressive force which the hydraulic motor 11 exerts onto the rod is constantly monitored by means of the two LVDTs 299a, 299b. If these LVDTs 299a, 299b detect that the motor 11 is beginning to apply a significant amount of compressive force onto the rod, the computer 402 will immediately stop the insertion subroutine.

After steps 492 and 493 have been completed, the computer 402 proceeds to step 495, and activates the withdrawal task specified in step 497 while lifting the collet 7 back upwardly into the sled assembly "full up" position. As is indicated in step 497, the withdrawal task comprises lifting the collet 7 away from the rod at a relatively slow rate of two feet per minute for one and a half inches, and then moving the collet 7 at the much faster rate of 15 feet per minute. This withdrawal task gives the operator an opportunity to stop the "insert" subroutine if the "rod present" LVDT 383 indicates that the rod is still within the collet 7 at the commencement of the withdrawal step.

Assuming that the rod has been successfully released in accordance with step 495, and that steps 496 and 497 have been performed without mishap, the computer 402 locks the sled in its "full up" position in accordance with step 498 by extending the tapered pin 327 into a bushing in sled plate 325, and then stops the sub-routine in step 499.

While not specifically indicated in any of the aforementioned flow chart steps, it should be noted that the general routine of the computer 402 includes several other safety features to prevent fuel rods from becoming bent or broken during either the extraction or insertion process. Generally, these safety "interlocks" include (a) driving the X, Y or Z hydraulic motors beyond specified distances, (b) withdrawing the duckbill assembly 178 with the guide members 180a, 180b closed, (c) driving the X or Y motors 87, 102 without locking the sled assembly 275 in place, and (d) driving the Z motor 11 when the sled assembly 275 is locked in place.

FIGS. 17 and 18 illustrate both the type of fuel rod assemblies 500 which may be reassembled or reconstituted by the system 1, as well as a rod loading fixture 525 which is useful in implementing the reassembly-type repairs by the system 1.

As has been previously indicated, the type of fuel rod assemblies 500 which may be reassembled or reconstituted by the system 1 generally comprise a plurality of fuel rods 502, each of which includes a tapered top end 505, which are uniformly arranged in a square grid pattern by a support skeleton 508. The support skeleton 508 includes a top nozzle 510, and a bottom nozzle 512 which stands on four legs 514a–514d. Included within the bottom nozzle 512 ar slots which may receive the extendable tongues 164a–164d of the clamping assembly 162 located on the bottom frame plate 144 of the previously described work station 16. The top nozzle 510 and the bottom nozzle 512 are rigidly interconnected to one another by an array of thimble rods 516. Disposed between these top and bottom nozzles are seven regularly spaced grids 520a–520g for uniformly spacing the fuel rods 502 from one another. Generally speaking, these grids are "egg crate" sheet metal structures, each of which includes a square array of rod-receiving apertures 523. The rod-receiving apertures 523 of each of the grids 520a–520g are mutually alignable with one another when the grid are properly affixed to the thimble rods 526 which form the frame of the support skeleton 508.

Turning now to the rod-loading fixture 525, this device generally comprises an apertured support plate 528 from which a square array of dummy, non-radioactive rods 530 are suspended. In the preferred embodiment, each of the dummy rods 530 includes a tapered end 550 in order to facilitate the insertion of the rods 530 into the rod-receiving apertures 523 and the grids 520a–520g. It should be noted that the apertured support plate 528 only has enough dummy rods 530 to fill every other set of rod-receiving apertures 523 in the grids 520a–520g.

FIGS. 19A, 19B and 19C illustrate the specific structure of the apertured support plate 528. The plate 528 includes a plurality of square-arrayed locking bolts 535, each of which is received in a countersunk position within a bore 537. Each of these locking bolts 535 includes a threaded end 539 which may be screwed into a threaded bore 531 of an end cap 543 mounted atop the tubular body 545 of each dummy rod 530. The generally square arrangement of the locking bolts 535 is registrable with every other rod-receiving aperture 523 of each of the grids 520a–520g. As has been previously mentioned, there are only half as many locking bolts 535 as rod-receiving apertures 523 in each of the grids 520a–520g, and the bolts 535 are arranged so that their respectively attached dummy rods 530 will substantially displace the rod-receiving space in every other one of the rod receiving apertures 523 in the grids 520a–520g. In the preferred embodiment, the outer diameter of the tubular body 545 of the dummy rods 530 is slightly smaller than the outer diameter of actual fuel rods (i.e., 0.393 in. vs. 0.422 in.), in order to facilitate the insertion of the dummy rods 530 into every other set of mutually registering rod receiving apertures 523 in the grids 520a–520g. Additionally, each of the dummy rods 530 includes the previously mentioned tapered end 550. The upper ends 552 of each of these tapered ends 550 is threadedly engageable with the lower end of its respective dummy rod 530. Additionally, each of these tapered ends 550 includes a centrally disposed bore 555 for admitting water when the fuel rod loading fixture 525 is lowered into a water-filled cask-loading shaft. If the dummy rods 530 were watertight, the air trapped inside them could render them buoyant and less easily alignable with the rod-receiving apertures 523 of the grids 520a–520g.

As may best be seen with reference to FIGS. 19A, 19D and 19E, the apertured support plate further includes a plurality of rod-receiving bores 558 disposed in square array between the previously described locking bolts 535. Each of these rod-receiving bores 558 serves, in combination with its surrounding dummy rods 530, as a guide mechanism when fuel rods are lowered therethrough. In order to enhance this rod-guide function of each of the bores 558, the upper ends 560 of each of these bores are bevelled 560. Finally, it should be noted that the bores 559 located around the periphery of the plate 528 are in the form of a U-shaped slots around the plate periphery.

The fuel rod loading fixture 525 facilitates the loading of an array of fuel rods within an empty support skeleton 508 in a reassembly-type repair operation. In such an operation, the upper ends of the thimble rods 516 are cut in order to allow the top nozzle 510 to be removed therefrom. In performing this step, a top nozzle removal and replacement fixture, such as that disclosed in U.S. patent application Ser. No. 670,729, filed Nov. 13, 1984 and assigned to Westinghouse Electric Corporation, may be used. Next, the fuel rod loading fixure 525 is then lowered by a crane-type tool (not shown) over the empty support skeleton 508 until its dummy rods 530 are in alignment with mutually aligned rod-receiving apertures in the grids 520a–520g. The fixture 525 is then completely lowered into the support skeleton 508. Fuel rods are then loaded into every other set of mutually registering grid-receiving apertures 523 in the grids 520a–520d by individually lowering such rods 502 through the rod-receiving bores 558 in the plate 528 by the rod handler 3. As is evident from FIG. 19A, each of these rod-receiving bores 558 is surrounded by four locking bolts 535 under which dummy fuel rods 530 are suspended. Both the rod-receiving bores 558 and the cage-like structure formed by the dummy rods 530 which extends below each of the rod-receiving bores 558 help properly guide a fuel rod 502 through a set of mutually aligned rod-receiving apertures 523 in the grids 520a–520g. Once a fuel rod 502 has been successfully inserted through every one of the rod-receiving bores 558, the fuel rod loading fixture 525 is reconnected to the crane-like device, and lifted from the support skeleton 508. Additional fuel rods 502 my then be inserted into the remaining sets of rod-receiving apertures 523 in grids 520a–520g. When this final step is performed, it should be noted that the staggered array formed by the initially inserted set of fuel rods 502 forms cage-like guiding structures for the second set of guide rods 502 when they are finally inserted through the remaining rod-receiving apertures 523 of the grids 520a–520g.

FIG. 20 illustrates the reassembly process associated with the reassembly and reconstituting system 1 of the invention, in which the previously described fuel rod loading fixture 525 plays a significant part.

Step 600 represents the first or "input" step of this process. In this step, a damaged fuel assembly 500 is presented for examination. In the next step 601 of the process, the presence or absence of damaged fuel rods is determined. If such damaged fuel rods are positively detected within the fuel rod assembly 500, the assembly 500 is lowered and clamped into work station 16 of the system 1, as indicated by step 602.

As indicated by process step 603, the top nozzle 510 is next removed from the fuel rod assembly 500, preferably by means of the previously referred to fixture developed by Westinghouse Electric Corporation. This top nozzle 510 is then disposed of, as indicated in process step 604.

In the next of the process, indicated by box 605, the rod handler 3 removes each of the fuel rods 502 of the fuel rod assembly 500. Although not specifically indicated in FIG. 20, the rod handler 3 loads the damaged and undamaged fuel rods 502 in different quandrants of the rod cannister 140 clamped within the centrally disposed work station 20. After this has been completed, a sufficient number of replacement fuel rods are placed into the quandrant of the rod cannister 140 to rebuild a new fuel rod assembly 500, as indicated by process step 606. After this step has been completed, both the damaged skeleton 508 and damaged fuel rods 502 of the fuel rod assembly 500 entered into the system 1 are disposed of, as indicated by process steps 607 and 608.

At this juncture of the process, a new skeleton is secured within the work station 16, as indicated by process step 609. Next, a new fuel rod assembly 500 is built in process steps 610 and 611 by using the rod handler 3 in combination with the fuel rod loading fixture 525 to insert the old but undamaged fuel rods (as well as the replacement fuel rods introduced in step 606) into every other set of rod-receiving apertures 523 in the grids 520a–520g of fuel rod assembly 500. The fuel rod loading fixture 525 is then removed from the fuel rod assembly 500 being rebuilt, and lowered into another empty support skeleton 508, as indicated by process step 612. Salvaged or new fuel rods are then loaded into the remaining rod-receiving spaces in the fuel assembly. Next, a new top nozzle 510 is attached onto the fuel rod assembly 500 which was rebuilt in part from the undamaged fuel rods salvaged from the initially introduced fuel rod assembly 500, as indicated by process step 613. Preferably, the new top nozzle 510 is attached to the thimble rods of the fuel assembly by expanding the ends of the thimble rods into bores in the top nozzle which have irregular profiles in order to create an interference-type joint between the top nozzle and the thimble rods. Any one of a variety of hydraulic or elastomeric type tube expanders may be used to implement this step. The strength of the resulting joint between the top nozzle and its thimble rods may then be tested by the mechanical clamping assembly 165 in work station 16 in the manner previously described.

Finally, as indicated by process steps 614, 615 and 616, the thimble tubes and all of the other structural parts of the reassembled fuel rod assembly 500 are inspected, and the assembly 500 is removed from the system 1. All of the specific rod extracting and insertion motions are implemented by the collet 7 of the rod handler 3 following instructions from the computer 402 of the control circuit 400.

We claim as our invention:

1. A system for remotely reassembling and reconstituting nuclear fuel rod assemblies, wherein said rod assemblies each include an array of nuclear fuel rods mounted within a support skeleton having rod-guiding grids, comprising:
   (a) a rod handling means for gripping, lifting, lowering and ungripping a selected fuel rod;
   (b) a first work station for securing a support skeleton, and a second work station for securing an array of fuel rods;
   (c) positioning means for positioning the rod handling means in selected positions over the first and second work stations in order to grip, lift, lower and ungrip selected fuel rods in selected positions, and
   (d) control means operatively connected to the rod handling means and the positioning means for remotely controlling the positioning of the rod handling means, and the gripping, lifting, lowering and ungripping of the rod handling means.

2. The system of claim 1, wherein said rod handling means includes an elongated housing for receiving said selected rod when said rod is lifted.

3. The system of claim 1, wherein said rod handling means includes a gripping assembly having a retractable collet for gripping and ungripping said selected rod, and a rod sensor for sensing when a rod is in a grippable position within said collet.

4. The system of claim 3, wherein said gripping assembly further includes a locking means for locking the collet into a gripping position around said selected rod.

5. The system of claim 1, further including a lifting force sensor operatively connected to the control means for sensing the amount of lifting force exerted upon said selected fuel rod by the rod handling means, and wherein said control means prevents said rod handling means from exerting a lifting force onto said selected fuel rod in excess of a preselected amount of said force.

6. The system of claim 1, wherein said positioning means includes a carriage for holding the rod handling means, a frame assembly for supporting the carriage, a rail and bearing means for slidably connecting the carriage to the frame assembly, and a leveling means for leveling said rail and bearing means in order to equilibrate the frictional forces therebetween at all points of relative travel between the rail and bearing means.

7. The system of claim 1, wherein said positioning means includes a frame assembly for supporting said rod handling means and frame clamp means for securing said frame assembly within a shaft.

8. The system of claim 1, wherein said first work station includes clamping means for securing said support skeleton at a selected position within said first work station.

9. The system of claim 8, wherein said first work station includes a strongback, and wherein said clamping means is a plurality of hydraulically actuated clamps which bias the grids of the support skeleton against the strongback when actuated.

10. A system for remotely reassembling and reconstituting nuclear fuel rod assemblies, wherein said rod assemblies each include an array of nuclear fuel rods mounted within a support skeleton, comprising:
    (a) a rod handling means for gripping, lifting, lowering and ungripping a selected fuel rod which includes a housing for receiving and covering said fuel rod when said fuel rod is lifted by the rod handling means, and a gripping assembly having a retractable collet for gripping and ungripping a selected fuel rod, a rod sensor for sensing when a fuel rod is in a grippable position within the collet, and a locking means for locking the collet into a gripping position around a fuel rod when said rod handling means lifts said rod;
    (b) a first work station for securing a support skeleton and a second work station for securing an array of fuel rods, whrein said first work station includes a clamping means for securing said support skeleton in a selected position within said first work station, and
    (c) a positioning means for positioning the rod handling means in selected positions over the first and second work stations in order to grip, lift, lower and ungrip selected fuel rods in selected positions, including a movable carriage for holding and moving the rod handling means between said first and second work stations, a frame assembly for supporting the movable carriage, and a base for supporting both the frame and the first and second work stations.

11. A system for remotely reassembling and reconstituting nuclear fuel rod assemblies within the water-filled, cask-loading shaft of a spent fuel area, wherein said rod assemblies each include an array of nuclear fuel rods mounted within a support skeleton formed from a plurality of rod grids supported by an array of support members, comprising:

(a) a rod handling means for gripping, lifting, lowering and ungripping a selected fuel rod which includes a housing for receiving and protecting said fuel rod against the shear forces applied onto the rod by the water in the cask-loading shaft when said rod is lifted and moved laterally within the shaft, and a gripping assembly having a retractable collet for gripping and ungripping a selected fuel rod and a rod sensor for sensing when a fuel rod is in a grippable position within the collet;

(b) a first work station for securing a support skeleton and a second work station for securing an array of fuel rods, wherein said first work station includes an array of clamps for biasing the grids of the support skeleton in a selected location within the work station;

(c) a positioning means for positioning the rod handling means in selected positions over the first and second work stations in order to grip, lift, lower and ungrip selected fuel rods in selected positions within said work stations, including a movable carriage for holding and moving the rod handling means between said first and second work stations, a frame assembly for supporting the movable carriage, rail and bearing means for slidably connecting said movable carriage to said frame assembly, motor means for driving said movable carriage into selected positions across said frame assembly, and a base for supporting both the frame assembly and the first and second work stations, and (d) a control means operatively connected to both the rod handling means and the motor means of the positioning means for remotely controlling the positioning of the movable carriage over selected positions of said first and second work stations, and the gripping, lifting, lowering and ungripping of selected rods therebetween.

12. The system of claim 11, wherein said base of said positioning means includes a plurality of adjustable legs for leveling the rail and bearing means which slidably connects the movable carriage to the frame assembly in order that the friction between the rail and bearing means may be equilibrated at all points across which the bearing means travels on the rail.

13. The system of claim 11, wherein said control means prevents said motor means from moving the movable carriage when said rod handling means is gripping, lifting or lowering a rod.

14. The system of claim 11, wherein said frame assembly includes at least one clamping means for securing the frame within the cask-loading shaft.

15. The system of claim 11, wherein said gripping assembly further includes a locking means for selectively locking said collet around a fuel rod.

16. A process for repairing a nuclear fuel rod assembly formed from an array of nuclear fuel rods mounted within a support skeleton formed from a top nozzle, a bottom nozzle and an array of thimble rods, comprising the steps of:

(a) positioning the nuclear fuel rod assembly in a first work station;

(b) positioning an array of fuel rods in a second work station;

(c) removing the top nozzle of the fuel rod assembly by cutting the thimble rods;

(d) remotely replacing all damaged fuel rods within the fuel rod assembly with rods in the second work station by means of a rod handling means capable of gripping, lifting, lowering and ungripping selected fuel rods in both the first and second work stations, and (e) securing a top nozzle back onto the fuel rod assembly by creating a plurality of interference type joints between the upper ends of the thimble tubes and the top nozzle.

17. A control system for a fuel rod repair system having a first hydraulic motor for driving a rod handler means for gripping, lifting, lowering and ungripping a rod, and second and third hydraulic motors for driving a positioning means laterally positioning the rod handler over a selected rod, comprising:

(a) first, second and third encoder means operatively connected to the first, second and third hydraulic motors, respectively, for generating electric pulses indicative of the extent of the vertical and horizontal distances that the rod handler and the positioning means move a selected rod;

(b) first, second and third electrically operated, proportional control valves fluidly connected between the first, second and third hydraulic motors and a hydraulic source of power, and (c) a control circuit electrically connected to the first, second and third hydraulic motors and the first, second and third control valves for directing the positioning of the rod handler over a selected fuel rod.

18. A system for remotely repairing a nuclear fuel rod assembly formed from an array of nuclear fuel rods mounted within a support skeleton, comprising:

(a) a rod handling means for gripping, lifting, lowering and ungripping a selected fuel rod;

(b) a first work station for securing a nuclear fuel rod assembly, and a second work station for securing a plurality of fuel rods for replacement at least one of the rods in the fuel assembly in the first work station, and (c) positioning means for positioning the rod handling means over a selected rod in the fuel rod assembly secured within the first work station.

19. The station of claim 18, furthr including a third work station for receiving the rods replaced in the fuel assembly that is secured in the first work station.

20. The system of claim 19, wherein said third work station also supplies fuel rods for replacing at least one of the fuel rods in the fuel assembly secured in the first work station.

21. The system of claim 18, wherein the rod handling means includes a gripping assembly for selectively gripping and ungripping said selected rod.

22. The system of claim 21, wherein the gripping assembly includes a rod sensor for sensing when a rod is in a grippable position within said gripping assembly.

23. The system of claim 21, further including a locking means for locking the gripping assembly into a gripping position around said selected rod.

24. The system of claim 18, further including a lifting force sensor for sensing the amount of lifting force exerted upon said selected fuel rod by the rod handling means, and a control means operatively connected to said lifting force sensor and said rod handling means for preventing said rod handling means from exerting a lifting force onto said selected fuel rod in excess of a preselected amount of force.

25. The system of claim 18, further including a vertical movement sensor for sensing when said rod handling means is lifting and lowering said selected fuel rod, and a control means operably connected to both said vertical movement sensor and to said positioning means for preventing said positioning means from moving said rod handling means when said rod handling means is lifting and lowering said fuel rod.

26. A system for remotely repairing a nuclear fuel rod assembly formed from an array of nuclear fuel rods mounted within a support skeleton, comprising:
(a) a rod handling means for gripping, lifting, lowering and ungripping a selected fuel rod;
(b) a work station for securing a nuclear fuel rod assembly, and
(c) a positioning means for positioning the rod handling means over a selected rod in the fuel rod assembly secured within the work station wherein said positioning means includes a frame assembly for supporting said rod handling means, a base for supporting both said frame assembly and said work station, and frame clamp means for securing said frame assembly within a shaft.

27. A system for remotely reassembling and reconstituting nuclear fuel rod assemblies, wherein said rod assemblies each include an array of nuclear fuel rods mounted within a support skeleton, comprising:
(a) a rod handling means for gripping, lifting, lowering and ungripping a selected fuel rod including a gripping assembly having a rod sensor for sensing when a rod is in a grippable position within the gripping assembly;
(b) a work station for securing a nuclear fuel rod assembly adjacent to a supply of fuel rods, and
(c) a positioning means for alternately positioning the gripping assembly over a selected rod in the fuel rod assembly and over a selected rod in the supply of fuel rods in order to reconstitute and fuel rod assembly.

28. The system of claim 27, further including a lifting force sensor for sensing the amount of lifting force exerted upon said selected fuel rod by the gripping assembly of the rod handling means, and a control means operatively connected to said lifting force sensor, said rod sensor, and said rod handling means for preventing said rod handling means from exerting a lifting force onto said selected fuel rod in excess of a preselected amount of force.

29. The system of claim 27, further including a vertical movement sensor for sensing when said gripping assembly of the rod handling means is lifting and lowering said selected fuel rod, and a control means operably connected to said vertical movement sensor, said rod sensor, and said positioning means for preventing said positioning means from moving said rod handling means when said rod handling means is lifting and lowering said fuel rod.

30. The systme of claim 27, further including a second work station for securing said supply of fuel rods.

* * * * *